US006629577B1

(12) United States Patent
Abend et al.

(10) Patent No.: US 6,629,577 B1
(45) Date of Patent: Oct. 7, 2003

(54) DRIVING APPARATUS FOR SPEED CHANGING AND STEERING OF A VEHICLE

(75) Inventors: Robert Abend, Morristown, TN (US); Kerwyn Stoll, Mattoon, IL (US)

(73) Assignee: Tuff Torq Corporation, Morristown, TN (US)

( * ) Notice: Subject to any disclaimer, the term of this patent is extended or adjusted under 35 U.S.C. 154(b) by 0 days.

(21) Appl. No.: 09/700,147
(22) PCT Filed: Jul. 2, 1998
(86) PCT No.: PCT/US98/13811
§ 371 (c)(1),
(2), (4) Date: Nov. 13, 2000
(87) PCT Pub. No.: WO00/01569
PCT Pub. Date: Jan. 13, 2000
(51) Int. Cl.[7] .................. B60K 17/10; B60K 17/00; B62D 11/00
(52) U.S. Cl. .................. 180/367; 180/305; 180/6.2
(58) Field of Search .................. 180/367, 6.2, 65.1, 180/65.2, 305, 6.3, 6.66, 6.32

(56) References Cited

U.S. PATENT DOCUMENTS 168,955 A    10/1875   Annin (List continued on next page.)

FOREIGN PATENT DOCUMENTS

| CH | 249274 | 4/1948 |
|---|---|---|
| DE | 42 24 887 A1 | 10/1993 |
| EP | 0 806 337 A1 | 12/1997 |
| FR | 1147142 | 10/1960 |
| GB | 2 303 829 A | 3/1997 |
| JP | 57-140277 | 8/1982 |
| JP | 63-227476 | 9/1988 |
| JP | 2-261952 | 10/1990 |
| JP | 6-264976 | 9/1994 |
| JP | 8-142906 | 6/1996 |
| JP | 9-202255 | 8/1997 |
| JP | 9-202258 | 8/1997 |
| JP | 9-202259 | 8/1997 |
| JP | 9-216522 | 8/1997 |
| WO | WO 92/12889 | 8/1992 |
| WO | WO 98/32645 | 7/1998 |
| WO | WO 99/40499 | 8/1999 |
| WO | WO 00/01569 | 1/2000 |

OTHER PUBLICATIONS

Brochure Regarding Differential Steering, pp. 4–15.
Excel Industries, Inc. "Hustler 4000 Series", 1995, pp. 1–8.
Michael Bargo, Jr., "Tanks and dozers turn on a dime with new all gear steering", Popular Science, Jul. 1985, pp. 60–62.

(List continued on next page.)

Primary Examiner—Paul N. Dickson
Assistant Examiner—Joselynn Y. Sliteris
(74) Attorney, Agent, or Firm—Sterne, Kessler, Goldstein & Fox P.L.L.C.

(57) ABSTRACT

A driving apparatus for speed changing and steering of a vehicle consists of a first driving unit for speed changing in advancing and reversing and a second driving unit for steering, which are arranged in a longitudinal row and are attached to a vehicle chassis. Each of the first driving unit and the second driving unit has a common structure, which comprises a housing and an HST and left and right differential output shafts contained in the housing. A left first differential output shaft and a left second differential output shaft are connected with each other so as to be rotated in the same direction, and a right first differential output shaft and a right second differential output shaft are connected with each other so as to be rotated in opposite directions. Both first and second HSTs of the first driving unit and a second driving unit receives power from engine through a common single belt. A movable swash plate of a hydraulic pump of the first HST is connected to a speed change pedal and a movable swash plate of a hydraulic pump of the second HST is connected to a steering wheel.

72 Claims, 9 Drawing Sheets

U.S. PATENT DOCUMENTS

| | | |
|---|---|---|
| 2,191,961 A | 2/1940 | Howell |
| 2,255,348 A | 9/1941 | Brown |
| 2,311,922 A | 2/1943 | Allin |
| 2,332,838 A | 10/1943 | Borgward |
| 2,336,911 A | 12/1943 | Zimmermann |
| 2,336,912 A | 12/1943 | Zimmermann |
| 2,391,735 A | 12/1945 | Orshansky, Jr. |
| 2,530,720 A | 11/1950 | Paulson |
| 2,745,506 A | 5/1956 | McCallum |
| 2,763,164 A | 9/1956 | Neklutin |
| 2,936,033 A | 5/1960 | Gates |
| 3,059,416 A | 10/1962 | Campbell |
| 3,371,734 A | 3/1968 | Zaunberger et al. |
| 3,376,760 A | 4/1968 | Gordainer |
| 3,395,671 A | 8/1968 | Zimmermann, Jr. |
| 3,450,218 A | 6/1969 | Looker |
| 3,492,891 A | 2/1970 | Livezey |
| 3,530,741 A | 9/1970 | Charest |
| 3,590,658 A | 7/1971 | Tuck |
| 3,596,535 A | 8/1971 | Polak |
| 3,603,176 A | 9/1971 | Tipping et al. |
| 3,612,199 A | 10/1971 | Vissers |
| 3,717,212 A | 2/1973 | Potter |
| 3,796,275 A | 3/1974 | Bouyer |
| 3,869,014 A | 3/1975 | Federspiel et al. |
| 3,901,339 A | 8/1975 | Williamson |
| 3,903,977 A | 9/1975 | Gillette et al. |
| 3,907,051 A | 9/1975 | Weant et al. |
| 3,966,005 A | 6/1976 | Binger |
| 3,978,937 A | 9/1976 | Chichester et al. |
| 4,133,404 A | 1/1979 | Griffin |
| 4,174,762 A | 11/1979 | Hopkins et al. |
| 4,245,524 A | 1/1981 | Dammon |
| 4,281,737 A | 8/1981 | Molzahn |
| 4,320,810 A | 3/1982 | Hillmann et al. |
| 4,399,882 A | 8/1983 | O'Neill et al. |
| 4,471,669 A | 9/1984 | Seaberg |
| 4,572,310 A | 2/1986 | Peter |
| 4,577,711 A | 3/1986 | Butler |
| 4,620,575 A | 11/1986 | Cuba et al. |
| 4,718,508 A | 1/1988 | Tervola |
| 4,729,257 A | 3/1988 | Nelson |
| 4,732,053 A | 3/1988 | Gleasman et al. |
| 4,738,328 A | 4/1988 | Hayden |
| 4,776,235 A | 10/1988 | Gleasman et al. |
| 4,776,236 A | 10/1988 | Gleasman et al. |
| 4,782,650 A | 11/1988 | Walker |
| 4,790,399 A | 12/1988 | Middlesworth |
| 4,809,796 A | 3/1989 | Yamaoka et al. |
| 4,813,506 A | 3/1989 | Smith |
| 4,870,820 A | 10/1989 | Nemoto |
| 4,875,536 A | 10/1989 | Saur et al. |
| 4,882,947 A | 11/1989 | Barnard |
| 4,895,052 A | 1/1990 | Gleasman et al. |
| 4,914,907 A | 4/1990 | Okada |
| 4,917,200 A | 4/1990 | Lucius |
| 4,932,209 A | 6/1990 | Okada et al. |
| 4,949,823 A | 8/1990 | Coutant et al. |
| 5,004,060 A | 4/1991 | Barbagli et al. |
| 5,015,221 A | 5/1991 | Smith |
| 5,052,511 A | 10/1991 | Hunt |
| 5,094,326 A | 3/1992 | Schemelin et al. |
| 5,131,483 A | 7/1992 | Parkes |
| RE34,057 E | 9/1992 | Middlesworth |
| 5,195,600 A | 3/1993 | Dorgan |
| 5,201,240 A | 4/1993 | Hayes et al. |
| 5,247,784 A | 9/1993 | Kitamura et al. |
| 5,279,376 A | 1/1994 | Yang et al. |
| 5,285,866 A | 2/1994 | Ackroyd |
| 5,307,612 A | 5/1994 | Tomiyama et al. |
| 5,314,387 A | 5/1994 | Hauser et al. |
| 5,335,739 A | 8/1994 | Pieterse et al. |
| 5,339,631 A | 8/1994 | Ohashi |
| 5,367,861 A | 11/1994 | Murakawa et al. |
| 5,383,528 A | 1/1995 | Nicol |
| 5,387,161 A | 2/1995 | Shibahata |
| 5,505,279 A | 4/1996 | Louis et al. |
| 5,507,138 A | 4/1996 | Wright et al. |
| 5,517,809 A | 5/1996 | Rich |
| 5,535,840 A | 7/1996 | Ishino et al. |
| 5,553,453 A | 9/1996 | Coutant et al. |
| 5,560,447 A | 10/1996 | Ishii et al. |
| 5,564,518 A | 10/1996 | Ishii et al. |
| 5,644,903 A | 7/1997 | Davis, Jr. |
| 5,649,606 A | 7/1997 | Bebernes et al. |
| 5,667,032 A | 9/1997 | Kamlukin |
| 5,706,907 A | 1/1998 | Unruh |
| 5,722,501 A | 3/1998 | Finch et al. |
| 5,775,437 A | 7/1998 | Ichikawa et al. |
| 5,782,142 A | 7/1998 | Abend et al. |
| 5,842,378 A | 12/1998 | Zellmer |
| 5,850,886 A | 12/1998 | Kuono et al. |
| 5,894,907 A | 4/1999 | Peter |
| 5,910,060 A | 6/1999 | Blume |
| 5,913,802 A | 6/1999 | Mullet et al. |
| 5,946,894 A | 9/1999 | Eavenson et al. |
| 5,947,219 A | 9/1999 | Peter et al. |
| 5,975,224 A | 11/1999 | Satzler |
| 5,997,425 A | 12/1999 | Coutant et al. |
| 6,026,634 A | 2/2000 | Peter et al. |
| 6,035,959 A | 3/2000 | Schaeder |
| 6,038,840 A | 3/2000 | Ishimori et al. |
| 6,098,386 A | 8/2000 | Shimizu et al. |
| 6,098,737 A | 8/2000 | Aoki |
| 6,098,740 A | 8/2000 | Abend et al. |
| 6,126,564 A | 10/2000 | Irikura et al. |
| 6,129,164 A | 10/2000 | Teal et al. |
| 6,141,947 A | 11/2000 | Borling |
| 6,152,248 A | 11/2000 | Hidaka et al. |
| 6,189,641 B1 | 2/2001 | Azuma |
| 6,196,342 B1 | 3/2001 | Teal et al. |
| 6,196,348 B1 | 3/2001 | Yano et al. |
| 6,257,357 B1 | 7/2001 | Teal et al. |
| 6,260,641 B1 | 7/2001 | Hidaka |
| 6,283,236 B1 | 9/2001 | Teal et al. |
| 6,354,388 B1 | 3/2002 | Teal et al. |
| 2001/0011610 A1 | 8/2001 | Teal et al. |

OTHER PUBLICATIONS

R.M. Ogorkiewicz, "Tank Steering Mechanisms", The Engineer, Mar. 3, 1967, pp. 337–340.

Excel Industries, Inc., "U–T–R The Ultimate Turning Radius", 1992, pp. 1–6.

Electric Tractor Corporation, "An Idea Whose Time Has Come", 5 pages, date of publication unknown, published in Ontario, Canada.

Electric Tractor Corporation, Model #9620, "The Ultimate Lawn and Garden Tractor", 6 pages, date of publication unknown.

Farm Show Magazine, "Battery Powered Riding mower", 1 page, date of publication, Mar.–Apr. 1996.

Deere & Company, "240, 245, 260, 265, 285 and 320 Lawn and Garden Tractors Technical Manual", front cover and pp. 10–2 to 10–4 and 10–6, date of publication, 1996.

U.S. application No. 09/372,747, filed Aug. 11, 1999, entitled Running Vehicle.

U.S. application No. 09/700,923, filed Nov. 21, 2000, entitled Transmission for Speed Changing and Steering of a Vehicle.

U.S. application No. 09/642,147, filed Aug. 21, 2000, entitled Axle Driving Apparatus.

U.S. application No. 09/489,680, filed Jan. 24, 2000, entitled Vehicle Improved in Steering.

U.S. application No. 09/489,678, filed Jan. 24, 2000, entitled Integral Hydrostatic Transaxle Apparatus for Driving and Steering.

U.S. application No. 09/622,414, filed Aug. 16, 2000, entitled Integral–type Hydraulic and Mechanical Transaxle Apparatus for Driving and Steering a Vehicle.

Woods Equipment Company, "Woods Mow'n Machine, Zero turning radius riding mower", 12 pages, 1997.

ExMark "Professional turf care equipment", 20 pages, 1997.

Dixon Industries, Inc., "Dixon ZTR Riding Mowers", pp. 1–4, 1997.

Shivvers, Mfg., "Zero turn radius mower, The Commercial Clipper", pp. 1–4, 1997.

Ferris Industries, Inc., "The ProCut Z Zero Turn Rider", pp. 1–2, 1997.

Zipper, TS Mower, "The Zipper–TS Mowers", pp. 1–2, 1997.

Westwood, "The Westwood Clipper, Owner's Instruction Manual", pp. 1–17, 19, date of publication unknown.

Patent Cooperation Treaty International Search Report, Int'l Application No. PCT/US98/13811, filed Jul. 2, 1998.

U.S. application No. 09/820,673 filed on Mar. 30, 2001, which is a continuation–in–part of U.S. application No. 09/372,747 filed Aug. 11, 1999.

U.S. application No. 09/821,043 filed on Mar. 30, 2001, which is a continuation–in–part of U.S. application No. 09/489,678, now U.S. patent No. 6,312,354.

DRIVING APPARATUS FOR SPEED CHANGING AND STEERING OF A VEHICLE

BACKGROUND OF THE INVENTION

1. Field of the Invention

The present invention relates to a driving apparatus for speed changing and steering of a vehicle comprising a pair of hydrostatic transmissions (hereinafter referred to as HSTs) for driving a pair of left and right axles, wherein one of the pair is used for steering and the other is used for speed changing in advancing and reversing.

2. Background Art

U.S. Pat. No. 4,782,650, for example, describes a vehicle provided with a pair of HSTs, which are disposed in a lateral row and are connected with each other, and left and right axles projecting respectively from the pair of the HSTs laterally outwardly. Driving wheels are fixed respectively onto the axles. The left and right axles are driven respectively by changing operation of slanting angles of movable swash plates of the pair of HSTs.

The left and right axles are driven at the same speed by the pair of HSTs in case of straight advancing and reversing. They are driven at different speeds in case of steering.

However, because the above mentioned conventional vehicle uses a different HST to drive each axle, it can advance or reverse straight only when the output rotational speeds of the pair of the HSTs are equal. Thus, each of the HSTs needs to be adjusted with respect to its output speed for a long time while in operation. Additionally, accuracy is required to produce parts of the HSTs to minimize different outputs between them. For example, if there is a difference in volume between hydraulic pumps or motors of the pair of the HSTs, feelings both in turning left and right are different from each other, thus the vehicle becomes hard to control.

Additionally, the above-described conventional vehicle is laterally wide because the pair of HSTs are laterally disposed between the left and right driving wheels.

Furthermore, a speed changing operating tool, such as a speed change pedal, is connected respectively to both output regulating members of the pair of HSTs. A steering operating tool, such as a steering wheel, is also connected to both HSTs. This results in complicated linkages between the speed changing operating tool and the both output regulating members, and between the steering operating tool and the both output regulating members. Thus, the cost for production of the linkages and the space required for them in the vehicle are increased. These linkages also require a more complicated control system for a steering wheel and a speed changing pedal.

Other conventional vehicles control steering using steered front wheels. These vehicles, however, have a large turning radius which is inefficient when operating in crowded areas. For example, when mowing lawn near trees, steered front wheels are inefficient because it takes several passes in order to complete the area adjacent to a single tree.

BRIEF SUMMARY OF THE INVENTION

A first object of the present invention is to provide a compact, low production cost driving apparatus for speed changing and steering of a vehicle including a pair of similarly structured driving units, each of which comprises a housing, an HST, a differential gear unit drivingly connected with the HST, and a pair of differential output shafts, enabling a vehicle provided with the driving apparatus to be operated in a straight line without requiring adjustment to equalize the output of both driving units and to have a small turning radius.

To achieve the first object, the driving apparatus consists of a first driving unit for speed changing in advancing and reversing of the vehicle, which integrally includes a first HST driven by a prime mover and a pair of left and right projecting differential output shafts drivingly connected with the first HST. The driving apparatus also includes a second driving unit for steering of the vehicle, which integrally includes a second HST driven by the prime mover and a pair of left and right projecting differential output shafts drivingly connected with the second HST. A pair of drive trains are interposed between each of the first and second differential output shafts. One of the drive trains drivingly connects the left first and left second output shafts with each other, the other drivingly connects the right first and right second output shafts with each other, so that the first and second differential output shafts connected by one of the two drive trains are rotated in the same direction with respect to each other and the other first and second differential output shafts connected by the other drive train are rotated in opposite directions with respect to each other.

In such a construction, an output regulating member of the first HST is connected with a speed changing operating tool, such as a foot pedal, to be used for speed changing in advancing and reversing. Driving wheels are attached to the first differential output shafts. The output regulating member of the second HST is connected with a steering operating tool, such as a steering wheel, to be used for steering.

Accordingly, the vehicle can spin or turn at a small radius. Also, the first differential output shafts projecting laterally from the single first driving unit can be used as left and right driving axles, so that the left and right axles do not need to be adjusted to equalize their speed, thereby simplifying the work when operating the vehicle in forward or reverse. Additionally, in a vehicle with multiple wheels, only the differential drive of the pair of driving wheels attached to the first differential output shafts is required for steering, thereby allowing a vehicle with multiple wheels to have simple driven wheels.

The speed of advancing and reversing of the vehicle can be steplessly changed by operation of the speed changing operating tool (the foot pedal) easily because of the stepless output regulation of the first HST. The vehicle can also be steered smoothly and easily by operation of the steering operating tool (the steering wheel) because of the stepless output regulation of the second HST.

The linkage between the speed changing operating tool and the output regulating member of the first HST and the linkage between the steering operating tool and the output regulating member of the second HST are simple and compact. These linkages are compactly disposed below an operator's deck.

The first and second driving units are attached to a vehicle chassis so as to be juxtaposed in either front or rear of each other, thereby enabling the vehicle provided with the driving apparatus to be laterally narrow. Thus, the vehicle can be compact and can have a very small turning circle in addition to the above mentioned drive trains.

With regard to the transmitting mechanism between an output shaft of the prime mover and the input shafts of the first and second HSTs of the first and second driving units, the output shaft is disposed between the input shafts of the first and second HST. Pulleys fixed onto the output shaft of the prime mover and the two input shafts of the first and second HSTs are bound with a single belt. Accordingly, the space required for the transmitting mechanism is small, thereby allowing for a more compact vehicle and the cost of production thereof is reduced due to the use of a single belt.

The prime mover is an engine having a vertically axial crankshaft. The output shaft of the engine is vertically axially disposed such that the transmitting mechanism is between the output shaft of the engine and the input shafts of the first and second HSTs.

Furthermore, a cutting deck is provided to the vehicle with a driving apparatus of the present invention. The vehicle can spin or turn at a small radius beside or among trees or buildings, thereby enabling the lawn mowing to be performed efficiently.

A second object of the present invention is to provide a compact, low production cost driving apparatus for speed changing and steering of a vehicle including a pair of similar HSTs and a pair of similar differential output gear units which are separated from but drivingly connected with their respective HST, enabling the vehicle provided with the driving apparatus to be operated in a straight line without requiring adjustment to equalizing output of both left and right axles, and to have a small turning circle.

To achieve the second object, the driving apparatus comprises a first HST driven by a prime mover, a first differential gear unit and a pair of left and right first differential output shafts for the purpose of speed changing in advancing and reversing. The driving apparatus also comprises a second HST driven by the prime mover, a second differential gear unit and a pair of left and right second differential output shafts for the purpose of steering. A pair of drive trains are interposed between the first and second differential output shafts, wherein one of the drive trains drivingly connects the left first and left second output shafts with each other, the other drive train drivingly connects the right first and second output shafts with each other, such that the first and second differential output shafts connected by one of the two drive trains are rotated in the same direction with respect to each other and the other first and second differential output shafts connected by the other drive train are rotated in opposite directions with respect to each other.

An HST unit and a differential gear unit separate from each other are widely produced at low cost because of their simple structures, so that the driving apparatus constructed by assembly of them can be reduced in cost.

In such a construction, the output regulating member of the first HST is connected with a speed changing operating tool, such as a foot pedal, to be used for speed changing in advancing and reversing. Driving wheels are attached to the first differential output shafts. The output regulating member of the second HST is connected with a steering operating tool, such a steering wheel, to be used for steering.

Accordingly, the vehicle can spin or turn at a small radius. Also, the first differential output shafts projecting laterally from the single first differential gear unit can be used as left and right driving axles, so that the left and right axles do not need to be adjusted to equalize their speed, thereby simplifying the work when operating the vehicle in forward or reverse. Additionally, in a vehicle with multiple wheels, only the differential drive of the pair of driving wheels attached to the first differential output shafts is required for steering, thereby allowing a vehicle with multiple wheels to have simple driven wheels.

The speed of advancing and reversing of the vehicle can be steplessly changed by operation of the speed changing operating tool (the foot pedal) easily because of the stepless output regulation of the first HST. The vehicle can be steered smoothly and easily by operation of the steering operating tool (the steering wheel) because of the stepless output regulation of the second HST.

The linkage between the speed changing operating tool and the output regulating member of the first HST and the linkage between the steering operating tool and the output regulating member of the second HST are simple and compact. These linkages are compactly disposed below an operator's deck.

With regard to the transmitting mechanism between an output shaft of the prime mover and the input shafts of the first and second HSTs of the first and second driving units, the output shaft is.disposed between the input shafts of the first and second HST. Pulleys fixed onto the output shaft of the prime mover and the two input shafts of the first and second HSTs are bound with a single belt. Accordingly, the space required for the transmitting mechanism is small, thereby allowing for a more compact vehicle and the cost of production thereof is reduced due to the use of a single belt.

The prime mover is an engine having a vertically axial crankshaft. The output shaft of the engine is vertically axially disposed such that the transmitting mechanism is between the output shaft of the engine and the input shafts of the first and second HSTs.

Furthermore, a mower unit is provided to the vehicle with a driving apparatus of the present invention. The vehicle can spin or turn at a small radius beside or among trees or buildings, thereby enabling the lawn mowing to be performed efficiently.

These and other objects of the invention will become more apparent in the detailed description and examples which follows.

BRIEF DESCRIPTION OF THE DRAWINGS/FIGURES

Figure 8:
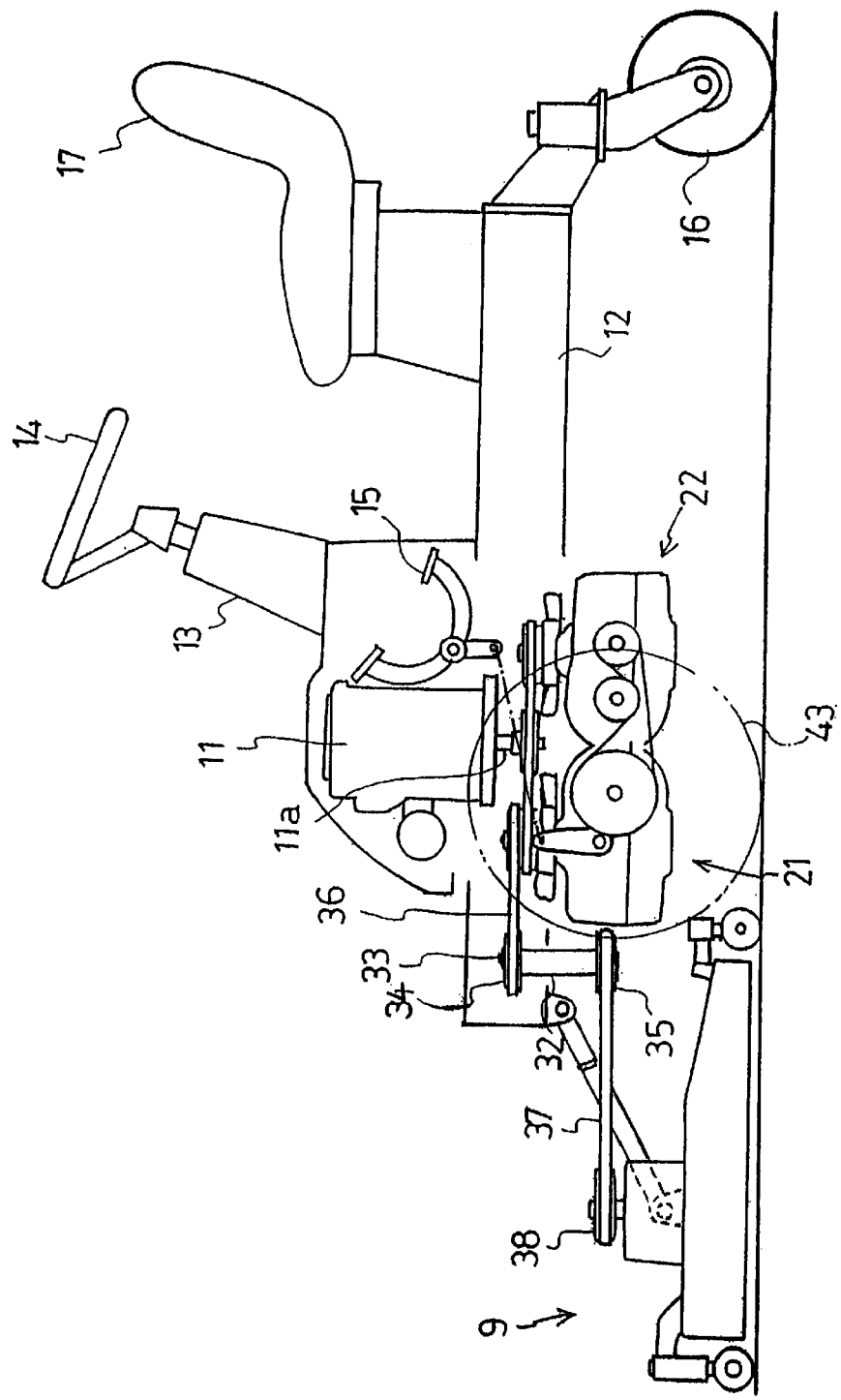
Figure 9:
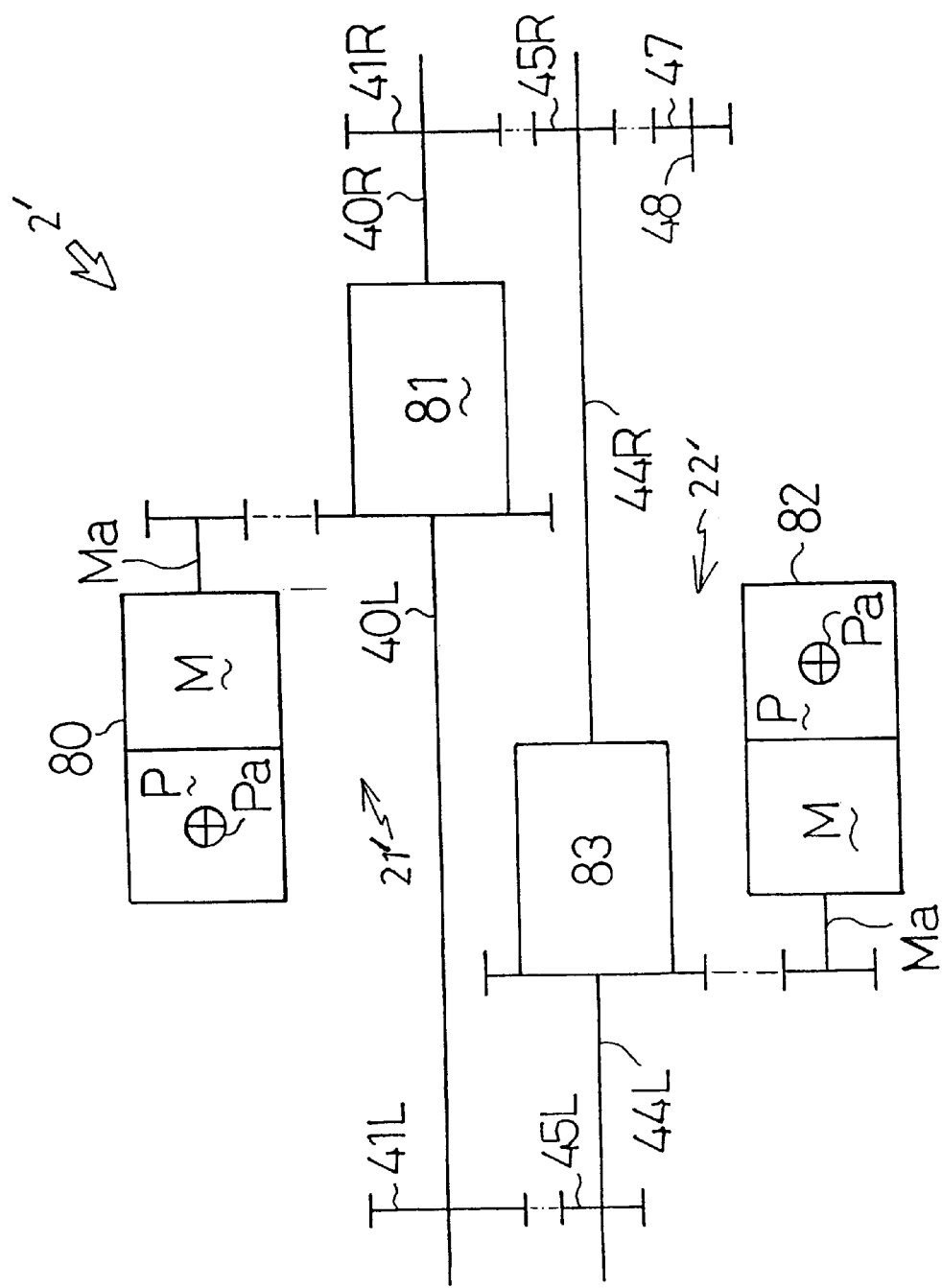

FIG. 8 is a schematic side view showing another entire lawn mower provided with the driving apparatus of the present invention, wherein a cutting deck is provided in front of the vehicle thereof, and FIG. 9 is a diagram of a power transmitting system of another driving apparatus of the present invention comprising a pair of driving units, wherein each driving unit includes an HST unit and an differential gear unit separated from each other.

DETAILED DESCRIPTION OF THE INVENTION

Figure 1:
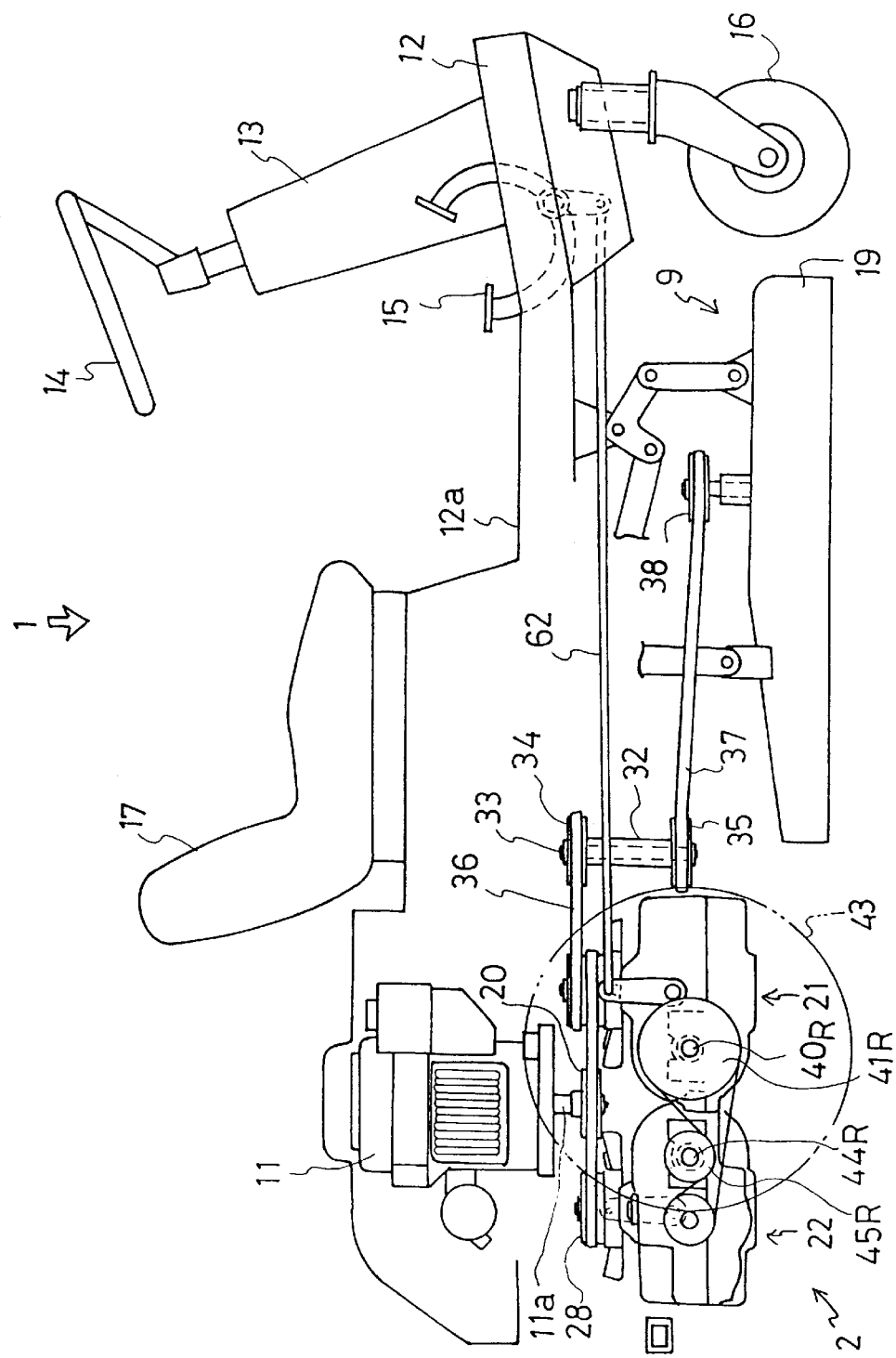
FIG. 1 is a side view showing an entire lawn tractor provided with a driving apparatus of the present invention.

As best seen in FIG. 1, the overall construction of a lawn tractor 1 provided with a driving apparatus of the present invention will be explained.

A front column 13 is provided upright on a front portion of a vehicle chassis 12. A steering wheel 14 as a steering operating tool projects upwardly from front column 13. A speed change pedal 15 and brake pedals (not shown) are disposed beside front column 13. A pair of front wheels 16 are disposed respectively on both lateral sides of the front lower portion of vehicle chassis 12. Front wheels 16 are caster wheels, having substantially vertical pivots, so that they can be horizontally rotated smoothly so as to be rapidly oriented toward the aiming direction when the vehicle turns by differential driving of left and right driving wheels. Thus, the feeling in steering of the vehicle can be improved. A single front wheel 16 or more than two front wheels 16 may be also used.

A seat 17 is mounted on a center portion of vehicle chassis 12. A deck portion 12a is formed as an operator's footboard on an upper end of vehicle chassis 12 in the vicinity of a front of seat 17. A mower unit 9 (a mower) is disposed below deck portion 12a. Mower unit 9 comprises a casing 19 provided therein with at least one rotary blade, which is driven by power from an engine 11 through pulleys, belt and the like. Mower unit 9 is suspended at front and rear portions of its casing 19 by linkages which are vertically movable.

Engine 11 is mounted on a rear portion of vehicle chassis 12 and is covered with a bonnet. Engine 11 has a vertically axial crankshaft provided with a vertically downwardly projecting output shaft 11a. An output pulley 20 is fixed onto a lower end of output shaft 11a.

Figure 2:
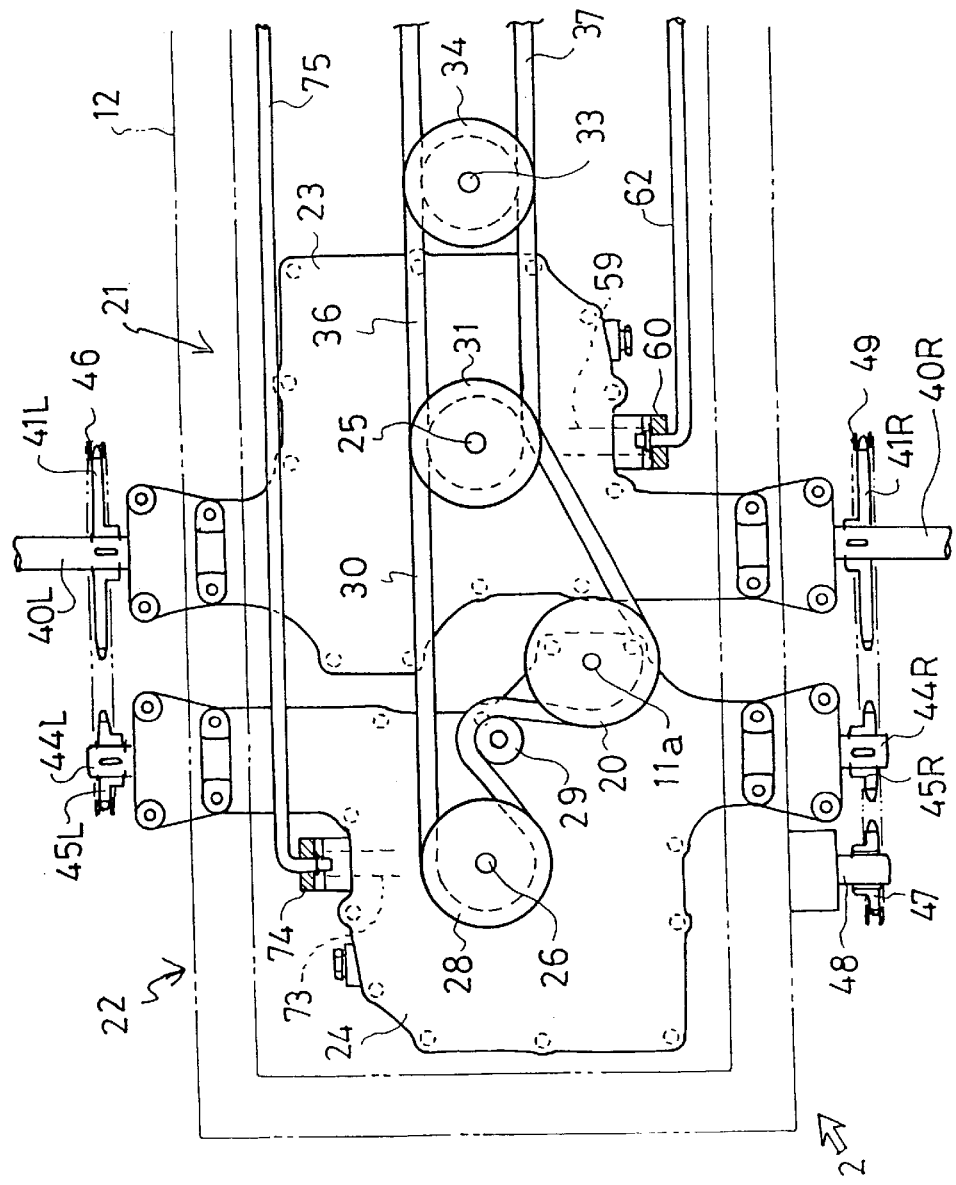
FIG. 2 is a plan view of a pair of driving units disposed in a longitudinal row.
Figure 3:
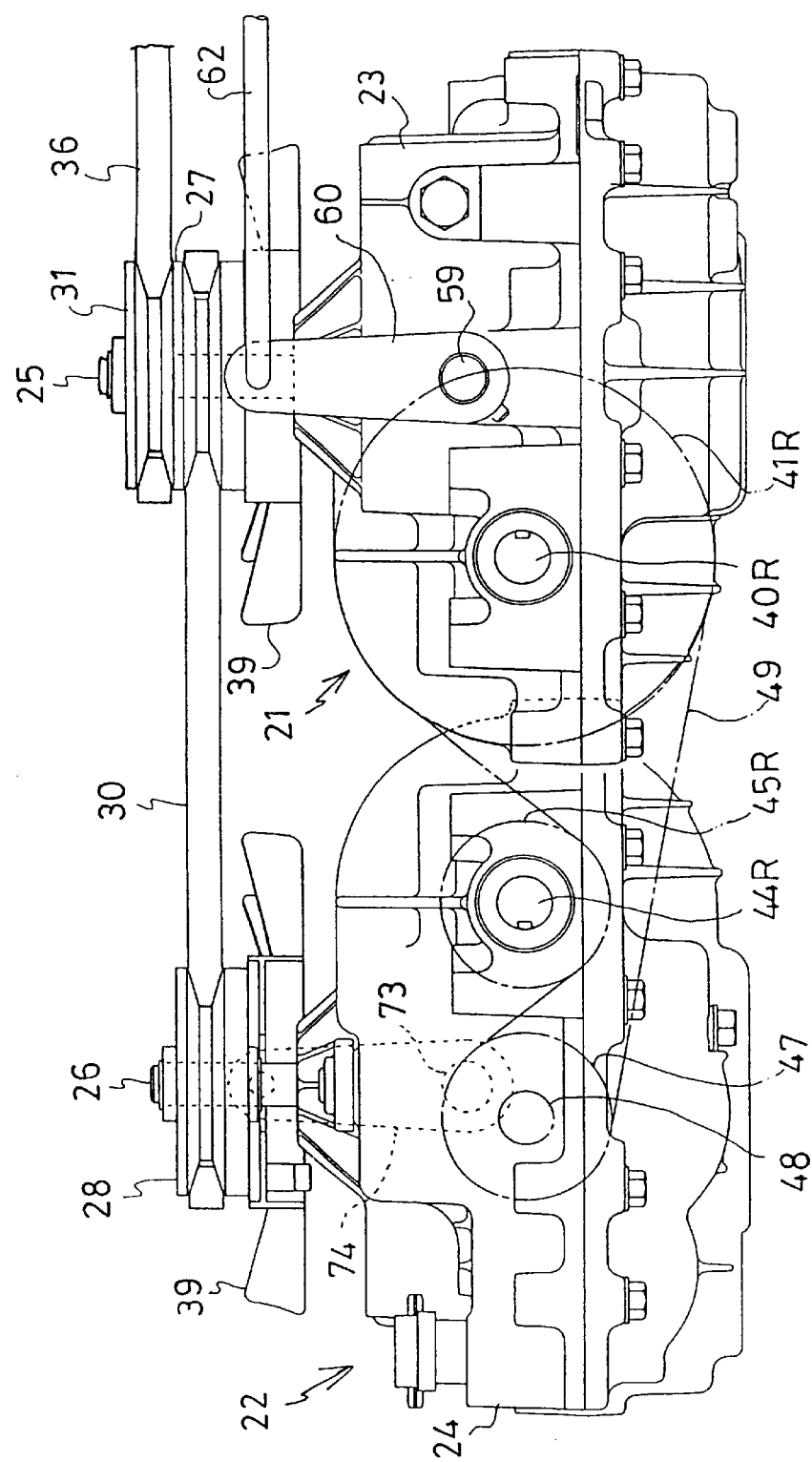
FIG. 3 is a right side view of a pair of driving units disposed in a longitudinal row.
Figure 4:
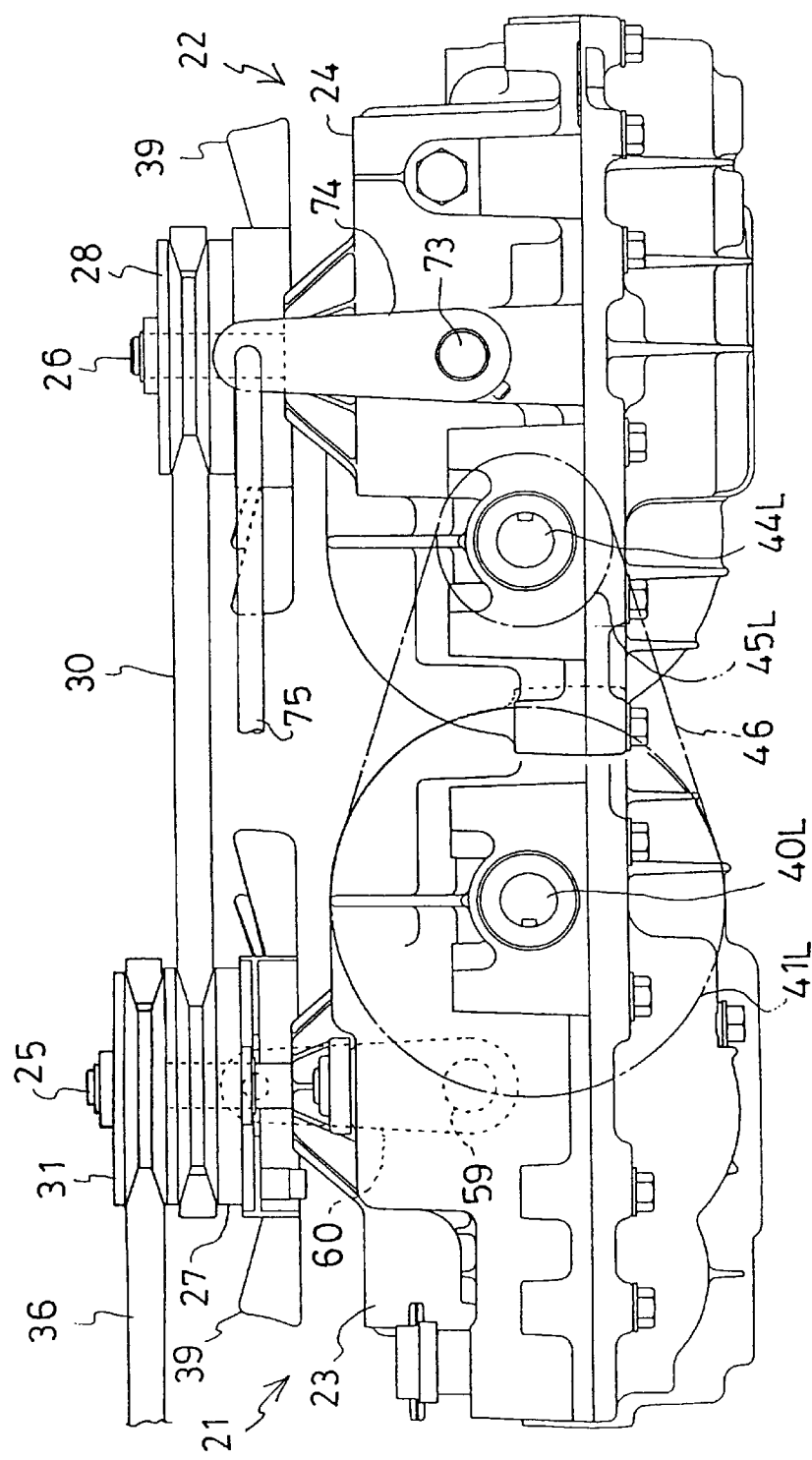
FIG. 4 is a left side view a pair of driving units disposed in a longitudinal row.

A driving apparatus 2 of the present invention is disposed on the lower rear portion of vehicle chassis 12. As shown in FIGS. 2, 3 and 4, driving apparatus 2 consists of a first driving unit 21 for speed changing in advancing and reversing and a second driving unit 22 for steering, which contain substantially similarly constructed hydrostatic transmissions (HSTs), respectively. Second driving unit 22 is preferably disposed in rear of first driving unit 21. They are oriented in longitudinally opposite directions and are fixed to vehicle chassis 12. Second driving unit 22 alternatively may be disposed in front of first driving unit 21.

A first input shaft 25 projects from a housing 23 of first driving unit 21 and a second input shaft 26 projects from a housing 24 of second driving unit 22.

A first input pulley 27 and a fan 39 is fixed onto first input shaft 25 and a second input pulley 28 and another fan 39 is fixed onto second input shaft 26. Output pulley 20 and a tension pulley 29 are disposed in a space between first and second input pulleys 27 and 28. All the pulleys 20, 27 and 28 are tied together with a single belt 30, so that first and second input shafts 25 and 26 can receive the power of engine 11 simultaneously. Tension pulley 29 is pushed against belt 30.

Another pulley 31 is fixed onto first input shaft 25. A support boss 32 is provided upright on a longitudinal intermediate of vehicle chassis 12. A counter shaft 33 rotatably penetrates support boss 32. For the purpose of driving of mower unit 9, pulleys 34 and 35 are fixed onto both upper and lower ends of counter shaft 33, and a belt 36 are interposed between pulleys 31 and 34. A belt tension clutch 37 may be disposed between pulleys 35 and 38, thereby enabling mower unit 9 to be drivingly switched on and off.

A pair of first differential output shafts (axles) 40L and 40R project respectively from both lateral sides of housing 23 of first driving unit 21. Sprockets 41L and 41R are fixed respectively onto first differential output shafts 40L and 40R. Rear wheels 43 are fixed respectively onto first differential output shafts 40L and 40R so as to be disposed outside of sprockets 41L and 41R, respectively.

With respect to the conventional vehicle provided with a pair of driving units disposed in lateral row, left and right driving axles are independently driven by the pair of driving units, which are separated from each other, thereby requiring output of the driving units to be equalized for straight advancing and reversing of the vehicle. However, the vehicle of the present invention is constructed so that the left and right axles constituted by first differential output shafts 40L and 40R are differentially connected with each other by a single differential gear unit within housing 23 of first driving unit 21, thereby requiring no adjustment to equalize the output of the axles.

Figure 7:
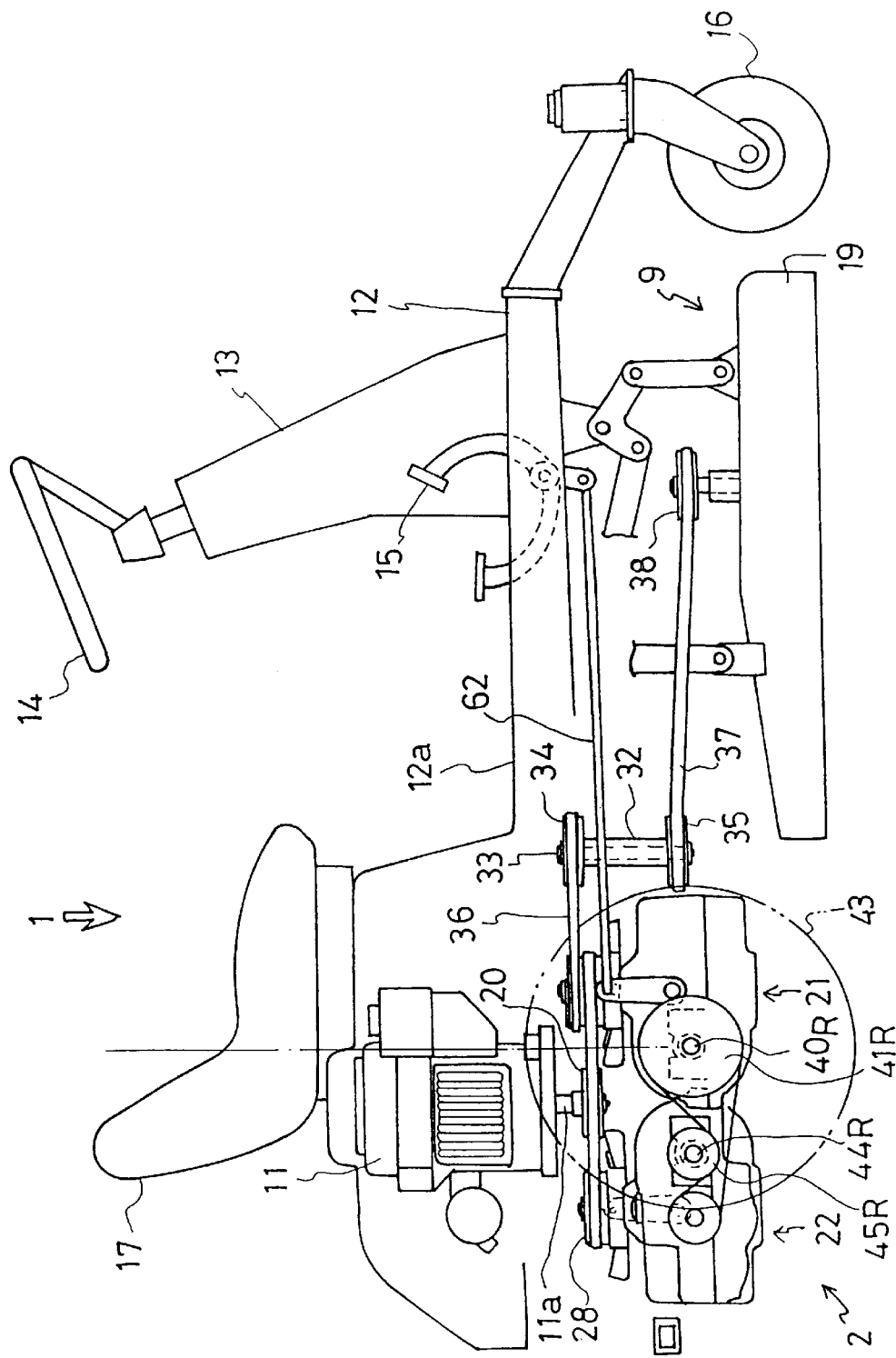
FIG. 7 is a side view showing another entire lawn tractor provided with the driving apparatus of the present invention, wherein a seat is mounted above the driving apparatus.

Vehicle 1 turns substantially around either rear wheel 43. As shown in FIG. 7, seat 17 may also be disposed just above first differential output shafts 40L and 40R. This places seat 17 vertically in line with rear wheels 43, thereby reducing the force on an operator when vehicle 1 is turned or spun.

FIG. 8 shows an alternative arrangement of vehicle 1 in which mower unit 9 is disposed in front of the vehicle body. In this arrangement, engine 11 is disposed in front of the driver's deck, driving wheels 43 are located in the front of vehicle 1 and caster wheels 16 are at the rear of vehicle 1. Such a construction allows mower unit 9 to cut the grass before any wheels have pressed down the grass. Also, vehicle 1 can mow easily with respect to a place which the vehicle body cannot enter, for example, a place beneath branches of a tree, because forwardly projecting mower unit 9 can enter such a place.

Returning to FIGS. 2, 3 and 4, a pair of second differential output shafts (steering output shafts) 44L and 44R project respectively from both lateral sides of housing 24 of second driving unit 22. Sprockets 45L and 45R are fixed respectively onto second differential output shafts 44L and 44R. Sprocket 45L is diametrically smaller than 41L, and sprocket 45R is diametrically smaller than sprocket 41R.

At one of the lateral sides (at a left side in this embodiment) of housings 23 and 24, a chain 46 is interposed between sprockets 41L and 45L, thereby constituting a first drive train. At the other side (right side in this embodiment), a sprocket 47 is disposed behind sprocket 45R and is rotatably supported onto a shaft 48 projecting laterally from vehicle chassis 12, and a chain 49 is interposed between sprockets 41R and 47, thereby constituting a second drive train.

Sprocket 45R engages at its lower end with chain 49. Accordingly, sprockets 41L and 45L or first and second differential shafts 40L and 44L of the first drive train are rotated in the same direction, and sprockets 41R and 45R or first and second differential shafts 40R and 44R of the second drive train are rotated in opposite directions. Thus, if second differential output shafts 44L and 44R rotates in the same rotational direction when both first differential output shafts 40L and 40R are neutral, sprockets 45L and 45R are rotated in the same rotational direction, so that first differential output shafts 40L and 40R are rotated in the opposite rotational directions. Gears, gears and shafts, belts and pulleys or the like may be used in place of the sprockets and chains for the purpose of constituting the first and second drive trains.

Figure 5:
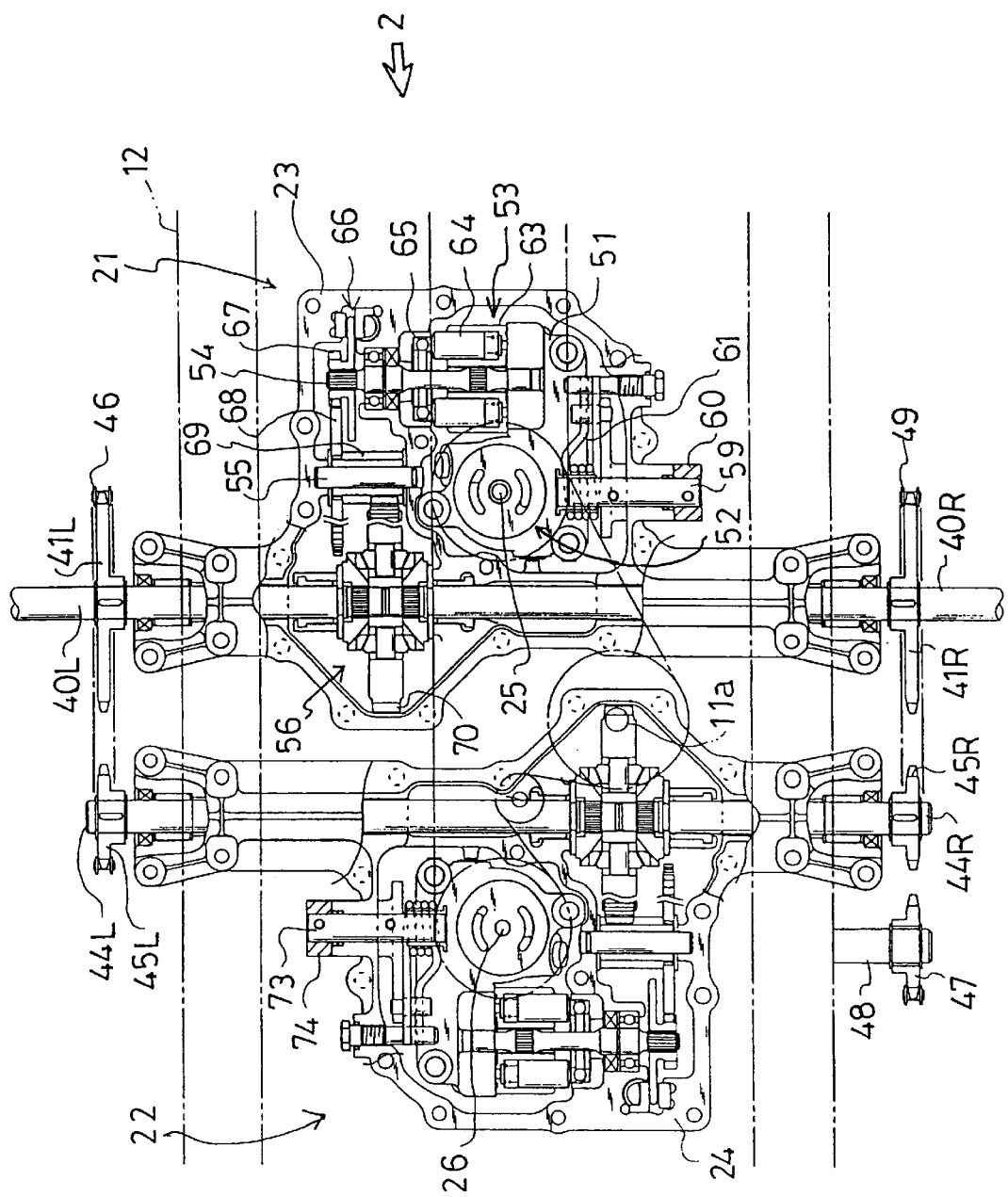
FIG. 5 is a sectional plan view a pair of driving units disposed in a longitudinal row.
Figure 6:
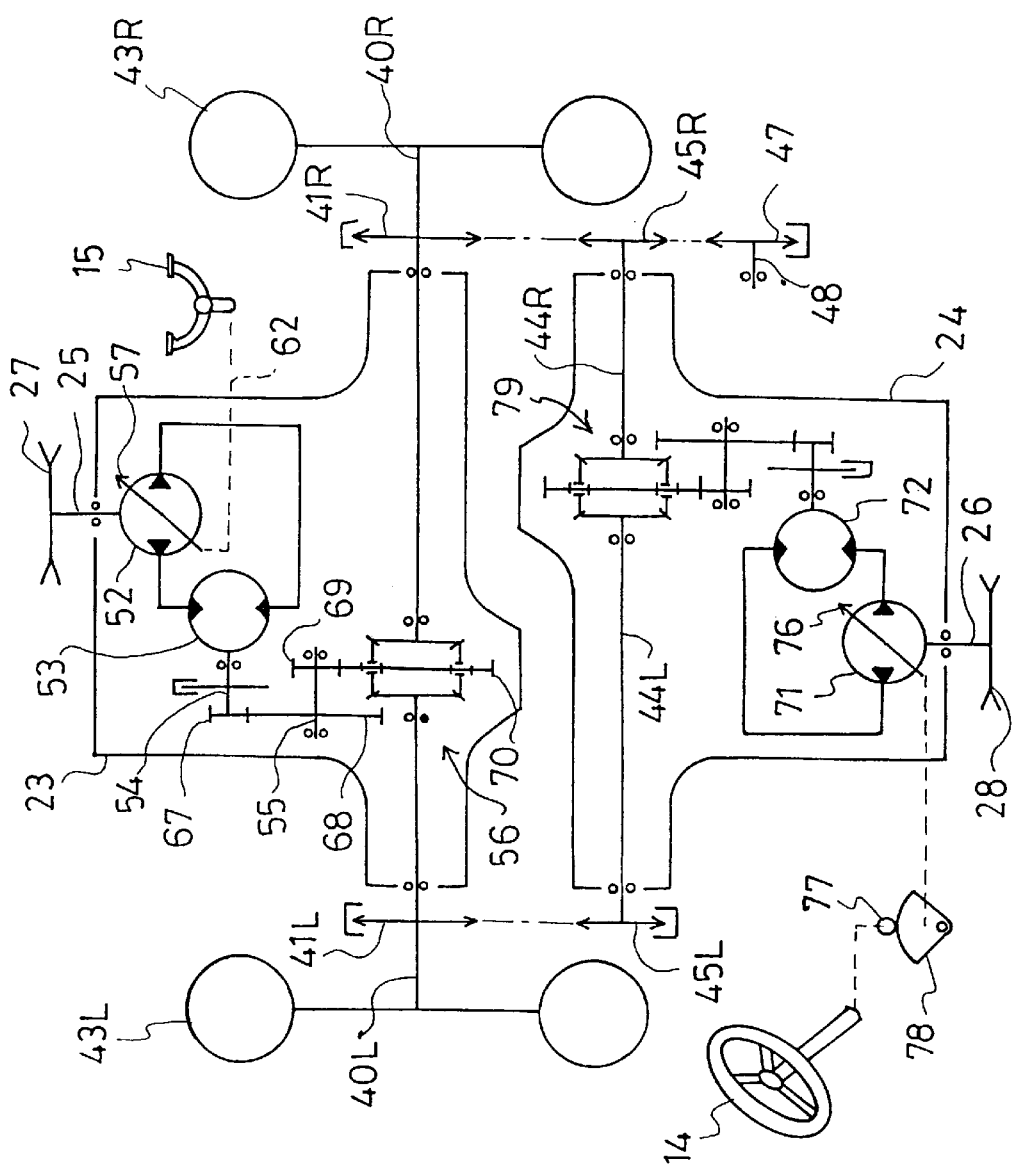
FIG. 6 is a diagram of a power transmitting system of the driving apparatus.

Next, explanation will be given on inner structures of first and second driving units 21 and 22, in accordance with FIGS. 5 and 6.

Housings 23 and 24 of first and second driving units 21 and 22 are similarly constructed. Each of housings 23 and 24 contains an HST, a differential gear unit, a drive train between the HST and the differential gear unit, and a pair of differential output shafts, all which comprise common components and are similarly structured.

At first, first driving unit 21 will be described. Housing 23, which consists of vertically divided halves separably joined with each other, contains a first HST, first differential output shafts 40L and 40R and a drive train drivingly connecting first HST with differential output shafts 40L and 40R. First HST comprises a L-like shaped center section 51 having a horizontal pump mounting surface and a vertical motor mounting surface, a hydraulic pump 52 mounted onto the horizontal pump mounting surface and a hydraulic motor 53 mounted onto the vertical motor mounting surface. Hydraulic motor 53 is disposed in front of hydraulic pump 52. Hydraulic pump 52 and hydraulic motor 53 are fluidly connected with each other through a closed fluid circuit formed within center section 51.

Housing 23 is constructed so that vertically divided halves are joined at their flat surrounding joint surfaces with each other along a horizontal joint plane. Bearing portions for a motor shaft 54 and a counter shaft 55 are provided on their joint surfaces, so that motor shaft 54 and counter shaft 55 are rotatably supported with their axes disposed on the horizontal joint plane. Bearing portions for rotatably supporting first differential output shafts 40L and 40R are eccentrically disposed above the horizontal joint plane. First differential output shafts 40L and 40R are differentially connected with each other through a differential gear unit 56 and respectively project at their utmost end portions laterally outwardly from the left and right outside ends of housing 23.

Hydraulic pump 52 is mounted on the horizontal pump mounting surface of center section 51. In this regard, an input shaft 25 as a pump shaft is vertically disposed along the axis of hydraulic pump 52. A cylinder block is anchored to input shaft 25 and is rotatably and slidably mounted on the horizontal pump mounting surface. A plurality of pistons are reciprocally movably inserted into the cylinder block through biasing springs. The heads of the pistons abut against a movable swash plate 57. Thus, by slanting operation of movable swash plate 57 as a output regulating member, the amount and direction of oil discharged from hydraulic pump 52 can be changed.

For the purpose of slanting operation of movable swash plate 57, a control shaft 59 is pivoted onto a side wall of housing 23 in parallel with first differential output shaft 40R. A neutral spring 61 for biasing movable swash plate 57 to its neutral position is fitted around a portion of control shaft 59 within housing 23, so as to enable its neutral position to be adjusted. A control arm 60 is fixed onto a portion of control shaft 59 out of housing 23 and is connected to a speed changing operating tool like a lever or a pedal through a link 62 and the like.

In this embodiment, the speed changing operating tool is speed change pedal 15. Speed change pedal 15 is pivoted at its longitudinally middle portion so that vehicle 1 advances by treading the front half portion of speed change pedal 15 and reverses by treading the rear half portion thereof. The speed of advancing and reversing of the vehicle can be steplessly controlled in proportion to degree of rotation of speed change pedal 15 by treading thereof. Speed change pedal 15 is shown constructed like a seesaw, but may alternatively be divided into two pedals. Other constructions can also replace it for a speed changing tool.

Link 62 is compactly disposed substantially longitudinally below deck portion 12a. In a conventional driving apparatus also comprised a pair of driving units with each used for both speed changing and steering, the speed changing operating tool, such as a pedal, required complicated connections to output regulating members of both HSTs units through a complicated linkage, for example a pair of links. Speed change pedal 15 of driving apparatus 2 of the present invention, to the contrary, is connected to only single control arm 60 through only single link 62, because only movable swash plate 57 of first driving unit 21 is used as an output regulating member for speed changing. Thus, vehicle 1 can be constructed more compactly and at a reduced cost.

In such a construction, control arm 60 is rotated along the longitudinal direction of the vehicle by rotational operation of speed change pedal 15 and movable swash plate 57 is slanted by rotation of control shaft 59, so that the amount and direction of operating oil discharged from hydraulic pump 52.

The pressure oil from hydraulic pump 52 is charged into hydraulic motor 53 through oil passages bored within center section 51. Hydraulic motor 53 comprises a cylinder block 63 rotatably slidably mounted onto the vertical motor mounting surface of center section 51. A plurality of cylinder holes are bored in cylinder block 63 and a plurality of pistons 64 are reciprocally movably inserted into the cylinder holes through biasing springs, respectively. Pistons 64 abut at their head against a fixed swash plate 65. Motor shaft 54 is horizontally disposed along the rotational axis of cylinder block 63 and is not relatively rotatably anchored to cylinder block 63. Hydraulic motor 53 is just so constructed.

Motor shaft 54 is provided thereon with a brake unit 66. A gear 67 is fixed onto an end portion of motor shaft 54. Gear 67 engages with a large diametric gear 68 fixed onto counter shaft 55. A small diametric gear 69 also fixed onto counter shaft 55 engages with a ring gear 70 of differential gear unit 56. Differential gear unit 56 is driven in state that ring gear 70 is rotated at reduced speed by the power transmitted from motor shaft 54, thereby driving left and right first differential output shafts 40L and 40R.

Second driving unit 22, which is disposed in a longitudinally opposite direction as first driving unit 21, similarly comprises housing 24 and a second HST including a hydraulic pump 71 and a hydraulic motor 72 contained in housing 24. A control shaft 73 for rotating a movable swash plate 76 of hydraulic pump 71 projects leftwardly from housing 24. A control arm 74 is fixed onto a portion of control shaft 73 out of housing 24 and is connected to steering wheel 14 through a link 75 and the like. Link 75 is compactly disposed substantially longitudinally below deck portion 12a. As shown in FIG. 6, a pinion 77 is fixed onto a basic portion of a stem of steering wheel 14 and engages with a fan-shaped gear 78. Gear 78 is connected with link 75. Thus, by rotational operation of steering wheel 14, gear 78 engages with pinion 77 and is rotated at reduced speed, so as to rotate movable swash plate 76 through link 75. Steering wheel 14 is rotatable from a straight travelling position in two opposite directions to the limits determined by gear 78.

Similar to the simplified construction described above for link 62 interposed between speed change pedal 15 and control arm 60, steering wheel 14 as a steering operating tool is simply connected to only single control arm 74 through single link 75 because only movable swash plate 76 of second driving unit 22 is used as an output regulating member for steering. As opposed to the complex linkages required for a steering and speed changing in a conventional system wherein each is connected to two laterally disposed HSTs which independently drive left and right axles, the linkages for steering and for speed change in accordance with the present invention are simplified, compact, and reduced in cost, thereby contributing to providing a compact vehicle at low cost.

Next, explanation will be given on controlling operation of a vehicle provided with driving apparatus 2 of the present invention so constructed as the above mentioned. When engine 11 is driven, input shafts 25 and 26 are always driven. For the purpose of straight advancing or reversing, steering wheel 14 is set in state of straight moving, so that second driving unit 22 is neutral. In this condition, movable swash plate 57 of first driving unit 21 is rotated by forward or rearward tread of speed change pedal 15. Thus, first differential output shafts 40L and 40R are driven at even speed, so that the vehicle advances or reverses.

When steering wheel 14 is rotated for right turning in state that the vehicle is advancing or reversing, movable swash plate 76 of second driving unit 22 is rotated so that hydraulic motor 72 is driven, thereby driving second differential output shafts 44L and 44R, so as to transmit an accelerating power to left first differential output shaft 40L, and second differential output shaft 44R is rotated oppositely to first differential output shaft 40R through sprockets 45R, 47 and 41R, thereby transmitting a decelerating power to right first differential output shaft 40R, so that vehicle 1 turns right. If steering wheel 14 is rotated so as to rotate hydraulic motor 72 in reverse direction, left differential output shaft 44L transmits a decelerating force to left differential output shaft 40L and right differential output shaft 44R transmits an accelerating force to right differential output shaft 40R, whereby vehicle 1 turns left.

When speed change pedal 15 is not trod, hydraulic pump 52 of first driving unit 21 is neutral. Then, if steering wheel 14 is rotated, movable swash plate 76 of second driving unit 22 is rotated so as to drive hydraulic motor 72. When second differential output shafts 44L and 44R are rotated in regular direction, left first differential output shaft 40L is rotated in advancing direction and right first differential output shaft 40R is rotated in reverse direction, so that vehicle 1 spins rightwardly. If steering wheel 14 is rotated so as to rotate second differential output shafts 44L and 44R in reverse direction, vehicle 1 spins leftwardly.

Driving apparatus 2 uses a pair of common structured driving units 21 and 22, each of which comprises an HST, a differential gear unit, a drive train between the HST and the differential gear unit and a pair of differential output shafts, one for speed changing in advancing and reversing and the other for steering, so that a common driving unit of the generally conventional structure can be used for the two different purposes, thereby reducing cost.

In another embodiment of the present invention, as shown in FIG. 9, driving apparatus 2' comprises a pair of a first driving system 21' for speed changing in advancing and reversing and a second driving system 22' for steering. Driving system 21' is constructed so that a first HST unit 80 and a first differential gear unit 81, which is separated from first HST unit 80 (that is, not contained within a housing of first HST unit 80), are drivingly connected with each other by a drive train such as a gear train, a chain and sprockets, belt and pulleys or the like. Second driving system 22' comprising a second HST unit 82 and a second differential gear unit 83 is similarly constructed, so that second differential gear unit 83 is separated from second HST unit 82.

Each of first and second HST units 80 and 82 comprises a housing and a hydraulic pump P and a hydraulic motor M, both of which are fluidly connected with each other, contained in the housing and disposed so that an input shaft Pa as a pump shaft of hydraulic pump P is vertically axially oriented and an output shaft Ma as a motor shaft of hydraulic motor M is horizontally laterally axially oriented. Each of first and second differential gear units 81 and 83 is disposed so that its respective input member (not shown), such as a gear, a sprocket, a pulley or the like is horizontally laterally axially disposed. Thus, each of the driving trains such as a gear train, a chain, a belt or the like is interposed longitudinally, vertically or longitudinally slantingly between output member Ma and the input member.

Each of differential gear units 81 and 83 is provided with left and right differential output shafts. Left and right first differential output shafts 40L and 40R as axles project laterally from both lateral sides of first differential gear unit 81. Left and right second differential output shafts 44L and 44R as driving shafts for steering project laterally from both lateral sides of second differential gear unit 83. The drive trains between left first and left second differential output shafts 40L and 44L and between right first and right second differential output shafts 40R and 44R are structured similarly with those of the above mentioned driving apparatus 2. In this regard, the left drive train between left differential output shafts 40L and 44L comprises chain 46 and sprockets 41L and 45L and the right drive train between right differential output shafts 40R and 44R comprises chain 49 and sprockets 41R, 45R and 47, so that left and right drive trains are so constructed as to be rotated in opposite directions to each other. Each of the drive trains may be replaced by a gear train, a belt and pulleys or the like.

In such an alternative embodiment, there are an HST unit and a differential gear unit independent to each other, which are widely produced. Each of the HST unit and the differential gear unit can be obtained at low cost because of its simple structure. Thus, driving apparatus 2' can be constructed at low cost by assembly of generally available HST units and differential gear units.

The previously described structures of driving apparatus 2 such as the linkage connecting movable swash plates of first and second HST units 21 and 22 respectively to speed change pedal 15 and steering wheel 14, the transmitting mechanism from output pulley 20 of engine 11 to input pulleys 27 and 28 of first and second HSTs through single belt 30, the attachment of mower unit 9 and other constructions can be similarly applied to driving apparatus 2'.

What is claimed is:

1. A transaxle apparatus for speed changing and steering of a vehicle, comprising:
    a vehicle chassis;
    a prime mover mounted on said vehicle chassis;
    a pair of drive wheels;
    a first driving unit for driving said pair of drive wheels forwardly and backwardly at various speeds, said first driving unit comprising,
        a pair of first and second axles differentially connected with each other, said pair of drive wheels being mounted onto said respective first and second axles,
        a first transmission transmitting power from said prime mover to said first and second axles, and
        driving output setting means, wherein said first and second axles are driven according to a direction and speed of output rotation of said first transmission determined by said driving output setting means; and
    a second driving unit for generating a difference of rotary speed between said pair of drive wheels so as to steer a vehicle, said second driving unit comprising,
        a pair of first and second steering output shafts differentially connected with each other, a second transmission transmitting power from said prime mover to said first and second steering output shafts, and steering output setting means, wherein said first and second steering output shafts are driven according to a direction and speed of output rotation of said second transmission determined by said steering output setting means.

2. The transaxle apparatus as set forth in claim 1, further comprising:

a first drive train interlocking said first axle and said first steering output shaft with each other so as to rotate said first axle and said first steering output shaft in the same direction, and a second drive train interlocking said second axle and said second steering output shaft with each other so as to rotate said second axle and said second steering output shaft in opposite directions, wherein said first and second steering output shafts are driven by said second transmission so as to generate a difference of rotation between said first and second axles.

3. The transaxle apparatus as set forth in claim 1, wherein said first and second axles of said first driving unit are extended perpendicularly to the traveling direction of said vehicle so as to be opposite to each other, and said first and second steering output shafts are extended in parallel to said first and second axles.

4. The transaxle apparatus as set forth in claim 3, wherein said first and second driving units are aligned along the traveling direction of said vehicle.

5. The transaxle apparatus as set forth in claim 4, further comprising:

a first drive train interlocking said first axle and said first steering output shaft with each other so as to rotate said first axle and said first steering output shaft in the same direction, and a second drive train interlocking said second axle and said second steering output shaft with each other so as to rotate said second axle and said second steering output shaft in opposite directions so that said first and second drive trains are disposed oppositely to each other with respect to said first and second driving units, wherein said first and second steering output shafts are driven by said second transmission so as to generate a difference of rotation between said first and second axles.

6. The transaxle apparatus as set forth in claim 1, wherein said first transmission is a hydrostatic stepless transmission comprising a hydraulic pump and a hydraulic motor fluidly connected with each other.

7. A transaxle apparatus for speed changing and steering of a vehicle, comprising:

a vehicle chassis;

a prime mover mounted on said vehicle chassis;

a pair of drive wheels;

a first driving unit for driving said pair of drive wheels forwardly and backwardly at various speeds, said first driving unit comprising, a pair of first and second axles differentially connected with each other, said pair of drive wheels being mounted onto said respective first and second axles, a first transmission transmitting power from said prime mover to said first and second axles, and driving output setting means, wherein said first and second axles are driven according to a direction and speed of output rotation of said first transmission determined by said driving output setting means; and a second driving unit for generating a difference of rotary speed between said pair of drive wheels so as to steer a vehicle, said second driving unit comprising, a pair of first and second steering output shafts differentially connected with each other, a second transmission transmitting power from said prime mover to said first and second steering output shafts, and steering output setting means, wherein said first and second steering output shafts are driven according to a direction and speed of output rotation of said second transmission determined by said steering output setting means, wherein said first transmission is a hydrostatic stepless transmission comprising a hydraulic pump and a hydraulic motor fluidly connected with each other and wherein said driving output setting means comprises a movable swash plate of said hydrostatic stepless transmission serving as said first transmission.

8. The transaxle apparatus as set forth in claim 1, wherein said driving output setting means interlocks with a speed control operating member provided on a driver's portion of said vehicle.

9. A transaxle apparatus for speed changing and steering of a vehicle, comprising:

a vehicle chassis;

a prime mover mounted on said vehicle chassis;

a pair of drive wheels;

a first driving unit for driving said pair of drive wheels forwardly and backwardly at various speeds, said first driving unit comprising, a pair of first and second axles differentially connected with each other, said pair of drive wheels being mounted onto said respective first and second axles, a first transmission transmitting power from said prime mover to said first and second axles, and driving output setting means, wherein said first and second axles are driven according to a direction and speed of output rotation of said first transmission determined by said driving output setting means; and a second driving unit for generating a difference of rotary speed between said pair of drive wheels so as to steer a vehicle, said second driving unit comprising, a pair of first and second steering output shafts differentially connected with each other, a second transmission transmitting power from said prime mover to said first and second steering output shafts, and steering output setting means, wherein said first and second steering output shafts are driven according to a direction and speed of output rotation of said second transmission determined by said steering output setting means, wherein said driving output setting means interlocks with a speed control operating member provided on a driver's portion of said vehicle and wherein a linkage interposed between said driving output setting means and said speed control operating member is disposed below said driver's portion of said vehicle.

10. A transaxle apparatus for speed changing and steering of a vehicle, comprising:

a vehicle chassis;

a prime mover mounted on said vehicle chassis;

a pair of drive wheels;

a first driving unit for driving said pair of drive wheels forwardly and backwardly at various speeds, said first driving unit comprising, a pair of first and second axles differentially connected with each other, said pair of drive wheels being mounted onto said respective first and second axles, a first transmission transmitting power from said prime mover to said first and second axles, and driving output setting means, wherein said first and second axles are driven according to a direction and speed of output rotation of said first transmission determined by said driving output setting means; and a second driving unit for generating a difference of rotary speed between said pair of drive wheels so as to steer a vehicle, said second driving unit comprising, a pair of first and second steering output shafts differentially connected with each other, a second transmission transmitting power from said prime mover to said first and second steering output shafts, and steering output setting means, wherein said first and second steering output shafts are driven according to a direction and speed of output rotation of said second transmission determined by said steering output setting means, wherein said driving output setting means interlocks with a speed control operating member provided on a driver's portion of said vehicle and wherein said driving output setting means comprises a lever rotated along the traveling direction of said vehicle according to the operation of said speed control operating member.

11. The transaxle apparatus as set forth in claim 10, wherein said lever of said driving output setting means interlocks with a movable swash plate of a hydrostatic stepless transmission serving as said first transmission comprising a hydraulic pump and a hydraulic motor fluidly connected with each other.

12. The transaxle apparatus as set forth in claim 8, wherein said speed control operating member is a foot pedal.

13. The transaxle apparatus as set forth in claim 12, wherein said foot pedal comprises a forward driving pedal and a backward driving pedal, and wherein a direction of output rotation of said first transmission is determined according to which is pressed, said forward driving pedal or said backward driving pedal.

14. The transaxle apparatus as set forth in claim 1, wherein said first driving unit comprises a first differential mechanism differentially connecting said first and second axles, so that the output of said first transmission is transmitted to said first and second axles through said first differential mechanism.

15. The transaxle apparatus as set forth in claim 14, wherein said first driving unit comprises a common housing so that said first transmission and said first differential mechanism are disposed in said common housing.

16. The transaxle apparatus as set forth in claim 14, wherein said first driving unit comprises a housing so that said first transmission is disposed in said housing and said first differential mechanism is disposed outside said housing.

17. The transaxle apparatus as set forth in claim 1, wherein said second transmission is a hydrostatic stepless transmission comprising a hydraulic pump and a hydraulic motor fluidly connected with each other.

18. A transaxle apparatus for speed changing and steering of a vehicle, comprising:

a vehicle chassis;

a prime mover mounted on said vehicle chassis;

a pair of drive wheels;

a first driving unit for driving said pair of drive wheels forwardly and backwardly at various speeds, said first driving unit comprising, a pair of first and second axles differentially connected with each other, said pair of drive wheels being mounted onto said respective first and second axles, a first transmission transmitting power from said prime mover to said first and second axles, and driving output setting means, wherein said first and second axles are driven according to a direction and speed of output rotation of said first transmission determined by said driving output setting means; and a second driving unit for generating a difference of rotary speed between said pair of drive wheels so as to steer a vehicle, said second driving unit comprising, a pair of first and second steering output shafts differentially connected with each other, a second transmission transmitting power from said prime mover to said first and second steering output shafts, and steering output setting means, wherein said first and second steering output shafts are driven according to a direction and speed of output rotation of said second transmission determined by said steering output setting means, wherein said second transmission is a hydrostatic stepless transmission comprising a hydraulic pump and a hydraulic motor fluidly connected with each other and wherein said steering output setting means comprises a movable swash plate of said hydrostatic stepless transmission serving as said second transmission.

19. The transaxle apparatus as set forth in claim 1, wherein said steering output setting means interlocks with a steering operating member provided on a driver's portion of said vehicle.

20. A transaxle apparatus for speed changing and steering of a vehicle, comprising:

a vehicle chassis;

a prime mover mounted on said vehicle chassis;

a pair of drive wheels;

a first driving unit for driving said pair of drive wheels forwardly and backwardly at various speeds, said first driving unit comprising, a pair of first and second axles differentially connected with each other, said pair of drive wheels being mounted onto said respective first and second axles, a first transmission transmitting power from said prime mover to said first and second axles, and driving output setting means, wherein said first and second axles are driven according to a direction and speed of output rotation of said first transmission determined by said driving output setting means; and a second driving unit for generating a difference of rotary speed between said pair of drive wheels so as to steer a vehicle, said second driving unit comprising, a pair of first and second steering output shafts differentially connected with each other, a second transmission transmitting power from said prime mover to said first and second steering output shafts, and steering output setting means, wherein said first and second steering output shafts are driven according to a direction and speed of output rotation of said second transmission determined by said steering output setting means, wherein said steering output setting means interlocks with a steering operating member provided on a driver's portion of said vehicle and wherein a linkage interposed between said steering output setting means and said steering operating member is disposed below said driver's portion of said vehicle.

21. A transaxle apparatus for speed changing and steeling of a vehicle, comprising:
   a vehicle chassis;
   a prime mover mounted on said vehicle chassis;
   a pair of drive wheels;
   a first driving unit for driving said pair of drive wheels forwardly and backwardly at various speeds, said first driving unit comprising,
      a pair of first and second axles differentially connected with each other, said pair of drive wheels being mounted onto said respective first and second axles,
      a first transmission transmitting power from said prime mover to said first and second axles, and
   driving output setting means, wherein said first and second axles are driven according to a direction and speed of output rotation of said first transmission determined by said driving output setting means; and
   a second driving unit for generating a difference of rotary speed between said pair of drive wheels so as to steer a vehicle, said second driving unit comprising,
      a pair of first and second steering output shafts differentially connected with each other,
      a second transmission transmitting power from said prime mover to said first and second steering output shafts, and
      steering output setting means, wherein said first and second steering output shafts are driven according to a direction and speed of output rotation of said second transmission determined by said steering output setting means,
   wherein said steering output setting means interlocks with a steering operating member provided on a driver's portion of said vehicle and wherein said steering output setting means comprises a lever rotated along the traveling direction of said vehicle according to the operation of said steering operating member.

22. The transaxle apparatus as set forth in claim 21, wherein said lever of said steering output setting means interlocks with a movable swash plate of a hydrostatic stepless transmission serving as said second transmission comprising a hydraulic pump and a hydraulic motor fluidly connected with each other.

23. The transaxle apparatus as set forth in claim 19, wherein said steering operating member is a steering wheel.

24. The transaxle apparatus as set forth in claim 23, wherein said steering wheel is rotatable from a straight traveling position in two opposite directions for left-turning and right-turning of said vehicle, and wherein a direction of output rotation of said second transmission is determined according to which direction said steering wheel is rotated from said straight traveling position.

25. The transaxle apparatus as set forth in claim 1, wherein said second driving unit comprises a second differential mechanism differentially connecting said first and second steering output shafts, so that the output of said second transmission is transmitted to said first and second steering output shafts through said second differential mechanism.

26. The transaxle apparatus as set forth in claim 25, wherein said second driving unit comprises a common housing so that said second transmission and said second differential mechanism are disposed in said common housing.

27. The transaxle apparatus as set forth in claim 25, wherein said second driving unit comprises a housing so that said second transmission is disposed in said housing and said second differential mechanism is disposed outside said housing.

28. The transaxle apparatus as set forth in claim 1, wherein said first driving unit comprises a first differential mechanism differentially connecting said first and second axles, so that the output of said first transmission is transmitted to said first and second axles through said first differential mechanism, and wherein said second driving unit comprises a second differential mechanism differentially connecting said first and second steering output shafts, so that the output of said second transmission is transmitted to said first and second steering output shafts through said second differential mechanism.

29. The transaxle apparatus as set forth in claim 25, wherein said first driving unit comprises a common first housing so that said first transmission and said first differential mechanism are disposed in said common first housing of said first driving unit, and wherein said second driving unit comprises a second common housing so that said second transmission and said second differential mechanism are disposed in said second common housing of said second driving unit.

30. The transaxle apparatus as set forth in claim 29, wherein said first and second driving units are aligned along the traveling direction of said vehicle, wherein said first and second axles supported by said first housing are extended perpendicularly to the traveling direction of said vehicle in opposite to each other, and wherein said first and second steering output shafts supported by said second housing are extended in parallel to said first and second axles, so that said first axle and said first steering output shaft are disposed on one side of said first and second housings and said second axle and said second steering output shaft are disposed on the other side of said first and second housings.

31. The transaxle apparatus as set forth in claim 30, further comprising:
   a first drive train interlocking said first axle and said first steering output shaft with each other so as to rotate said first axle and said first steering output shaft in the same direction, and
   a second drive train interlocking said second axle and said second steering output shaft with each other so as to rotate said second axle and said second steering output shaft in opposite directions so that said first and second drive trains are disposed oppositely to each other with respect to said first and second housings, wherein said first and second steering output shafts are driven by said second transmission so as to generate a difference of rotation between said first and second axles.

32. The transaxle apparatus as set forth in claim 28, wherein said first driving unit comprises a first housing so that said first transmission is disposed in said first housing and said first differential mechanism is disposed outside said first housing, and wherein said second driving unit comprises a second housing so that said second transmission is disposed in said second housing and said second differential mechanism is disposed outside said second housing.

33. The transaxle apparatus as set forth in claim 32, further comprising:
   a first drive train interlocking said first axle and said first steering output shaft with each other so as to rotate said first axle and said first steering output shaft in the same direction, and a second drive train interlocking said second axle and said second steering output shaft with each other so as to rotate said second axle and said second steering output shaft in opposite directions, wherein said first and second steering output shafts are driven by said second transmission so as to generate a difference of rotation between said first and second axles.

34. The transaxle apparatus as set forth in claim 1, wherein said driving output setting means interlocks with a speed control operating member provided on a driver's portion of said vehicle, and wherein said steering output setting means interlocks with a steering operating member provided on said driver's portion of said vehicle.

35. A transaxle apparatus for speed changing and steering of a vehicle, comprising:

a vehicle chassis;

a prime mover mounted on said vehicle chassis;

a pair of drive wheels;

a first driving unit for driving said pair of drive wheels forwardly and backwardly at various speeds, said first driving unit comprising,
    a pair of first and second axles differentially connected with each other, said pair of drive wheels being mounted onto said respective first and second axles,
    a first transmission transmitting power from said prime mover to said first and second axles, and
    driving output setting means, wherein said first and second axles are driven according to a direction and speed of output rotation of said first transmission determined by said driving output setting means; and a second driving unit for generating a difference of rotary speed between said pair of drive wheels so as to steer a vehicle, said second driving unit comprising,
    a pair of first and second steering output shafts differentially connected with each other,
    a second transmission transmitting power from said prime mover to said first and second steering output shafts, and
    steering output setting means, wherein said first and second steering output shafts are driven according to a direction and speed of output rotation of said second transmission determined by said steering output setting means, wherein said driving output setting means interlocks with a speed control operating member provided on a driver's portion of said vehicle, and wherein said steering output setting means interlocks with a steering operating member provided on said driver's portion of said vehicle and wherein linkages interposed between said driving output setting means and said speed control operating member and interposed between said steering output setting means and said steering operating member are disposed below said driver's portion of said vehicle.

36. The transaxle apparatus as set forth in claim 34, wherein said driving output setting means comprises a lever rotated along the traveling direction of said vehicle according to the operation of said speed control operating member, and wherein said steering output setting means comprises a lever rotated along the traveling direction of said vehicle according to the operation of said steering operating member.

37. The transaxle apparatus as set forth in claim 34, wherein said speed control operating member is a foot pedal and said steering operating member is a steering wheel.

38. The transaxle apparatus as set forth in claim 37, wherein said foot pedal comprises a forward driving pedal and a backward driving pedal, and wherein a direction of output rotation of said first transmission is determined according to which is pressed, said forward driving pedal or said backward driving pedal.

39. The transaxle apparatus as set forth in claim 37, wherein said steering wheel is rotatable from a straight traveling position in two opposite directions for left-turning and right-turning of said vehicle, and wherein a direction of output rotation of said second transmission is determined according to which direction said steering wheel is rotated from said straight traveling position.

40. A transaxle apparatus for speed changing and steering of a vehicle, comprising:

a vehicle chassis;

a prime mover mounted on said vehicle chassis;

a pair of drive wheels;

a first driving unit for driving said pair of drive wheels forwardly and backwardly at various speeds, said first driving unit comprising,
    a pair of first and second axles differentially connected with each other, said pair of drive wheels being mounted onto said respective first and second axles,
    a first transmission transmitting power from said prime mover to said first and second axles, and
    driving output setting means, wherein said first and second axles are driven according to a direction and speed of output rotation of said first transmission determined by said driving output setting means; and a second driving unit for generating a difference of rotary speed between said pair of drive wheels so as to steer a vehicle, said second driving unit comprising,
    a pair of first and second steering output shafts differentially connected with each other,
    a second transmission transmitting power from said prime mover to said first and second steering output shafts, and
    steering output setting means, wherein said first and second steering output shafts are driven according to a direction and speed of output rotation of said second transmission determined by said steering output setting means, wherein an output shaft of said prime mover is disposed between an input shaft of said first transmission and an input shaft of said second transmission.

41. The transaxle apparatus as set forth in claim 40, wherein three pulleys respectively provided on said output shaft of said prime mover and input shafts of said first and second transmissions are bound through a single belt.

42. The transaxle apparatus as set forth in claim 41, wherein said prime mover is an engine provided with a crankshaft having a vertical axis.

43. The transaxle apparatus as set forth in claim 1, wherein at least one caster is supported by said vehicle chassis.

44. The transaxle apparatus as set forth in claim 1, wherein said vehicle is provided with a mower unit.

45. A transaxle apparatus for speed changing and steering of a vehicle, comprising:

a vehicle chassis;

a prime mover mounted on said vehicle chassis;

a pair of drive wheels;

a first driving unit for driving said pair of drive wheels forwardly and backwardly at various speeds, said first driving unit comprising,
    a pair of first and second axles differentially connected with each other, said pair of drive wheels being mounted onto said respective first and second axles, a first hydrostatic stepless transmission including a hydraulic pump and a hydraulic motor fluidly connected with each other for transmitting power from said prime mover to said first and second axles, and driving output setting means, wherein said first and second axles are driven according to a direction and speed of output rotation of said hydraulic motor of said first hydrostatic stepless transmission determined by said driving output setting means; and a second driving unit for generating a difference of rotary speed between said pair of drive wheels so as to steer a vehicle, said second driving unit comprising, a pair of first and second steering output shafts differentially connected with each other, a second hydrostatic stepless transmission including a hydraulic pump and a hydraulic motor fluidly connected with each other for transmitting power from said prime mover to said first and second steering output shafts, and steering output setting means, wherein said first and second steering output shafts are driven according to a direction and speed of output rotation of said hydraulic motor of said second hydrostatic stepless transmission determined by said steering output setting means.

46. The transaxle apparatus as set forth in claim 45, further comprising:

a first drive train interlocking said first axle and said first steering output shaft with each other so as to rotate said first axle and said first steering output shaft in the same direction, and a second drive train interlocking said second axle and said second steering output shaft with each other so as to rotate said second axle and said second steering output shaft in opposite directions, wherein said first and second steering output shafts are driven by said hydraulic motor of said second hydrostatic stepless transmission so as to generate a difference of rotation between said first and second axles.

47. The transaxle apparatus as set forth in claim 46, wherein said first and second axles of said first driving unit are extended perpendicularly to the traveling direction of said vehicle so as to be opposite to each other, and said first and second steering output shafts are extended in parallel to said first and second axles.

48. The transaxle apparatus as set forth in claim 47, wherein said first and second driving units are aligned along the traveling direction of said vehicle.

49. The transaxle apparatus as set forth in claim 48, further comprising:

a first drive train interlocking said first axle and said first steering output shaft with each other so as to rotate said first axle and said first steering output shaft in the same direction, and a second drive train interlocking said second axle and said second steering output shaft with each other so as to rotate said second axle and said second steering output shaft in opposite directions so that said first and second drive trains are disposed oppositely to each other with respect to said first and second driving units, wherein said first and second steering output shafts are driven by said hydraulic motor of said second hydrostatic stepless transmission so as to generate a difference of rotation between said first and second axles.

50. The transaxle apparatus as set forth in claim 45, wherein said first driving unit comprises a first differential mechanism differentially connecting said first and second axles, so that the output of said hydraulic motor of said first hydrostatic stepless transmission is transmitted to said first and second axles through said first differential mechanism, and wherein said second driving unit comprises a second differential mechanism differentially connecting said first and second steering output shafts, so that the output of said hydraulic motor of said second hydrostatic stepless transmission is transmitted to said first and second steering output shafts through said second differential mechanism.

51. The transaxle apparatus as set forth in claim 50, wherein said first driving unit comprises a common first housing so that said first hydrostatic stepless transmission and said first differential mechanism are disposed in said common first housing of said first driving unit, and wherein said second driving unit comprises a second common housing so that said second hydrostatic stepless transmission and said second differential mechanism are disposed in said second common housing of said second driving unit.

52. The transaxle apparatus as set forth in claim 51, wherein said first and second driving units are aligned along the traveling direction of said vehicle, wherein said first and second axles supported by said first housing are extended perpendicularly to the traveling direction of said vehicle in opposite to each other, and wherein said first and second steering output shafts supported by said second housing are extended in parallel to said first and second axles, so that said first axle and said first steering output shaft are disposed on one side of said first and second housings and said second axle and said second steering output shaft are disposed on the other side of said first and second housings.

53. The transaxle apparatus as set forth in claim 52, further comprising:

a first drive train interlocking said first axle and said first steering output shaft with each other so as to rotate said first axle and said first steering output shaft in the same direction, and a second drive train interlocking said second axle and said second steering output shaft with each other so as to rotate said second axle and said second steering output shaft in opposite directions so that said first and second drive trains are disposed oppositely to each other with respect to said first and second housings, wherein said first and second steering output shafts are driven by said hydraulic motor of said second hydrostatic stepless transmission so as to generate a difference of rotation between said first and second axles.

54. The transaxle apparatus as set forth in claim 53, wherein said first driving unit comprises a first housing so that said first hydrostatic stepless transmission is disposed in said first housing and said first differential mechanism is disposed outside said first housing, and wherein said second driving unit comprises a second housing so that said second hydrostatic stepless transmission is disposed in said second housing and said second differential mechanism is disposed outside said second housing.

55. The transaxle apparatus as set forth in claim 54, further comprising:

a first drive train interlocking said first axle and said first steering output shaft with each other so as to rotate said first axle and said first steering output shaft in the same direction, and a second drive train interlocking said second axle and said second steering output shaft with each other so as to rotate said second axle and said second steering output shaft in opposite directions, wherein said first and second steering output shafts are driven by said hydraulic motor of said second stepless transmission so as to generate a difference of rotation between said first and second axles.

56. A transaxle apparatus for speed changing and steering of a vehicle, comprising:
   a vehicle chassis;
   a prime mover mounted on said vehicle chassis;
   a pair of drive wheels;
   a first driving unit for driving said pair of drive wheels forwardly and backwardly at various speeds, said first driving unit comprising,
      a pair of first and second axles differentially connected with each other, said pair of drive wheels being mounted onto said respective first and second axles,
      a first hydrostatic stepless transmission including a hydraulic pump and a hydraulic motor fluidly connected with each other for transmitting power from said prime mover to said first and second axles, and
      driving output setting means, wherein said first and second axles are driven according to a direction and speed of output rotation of said hydraulic motor of said first hydrostatic stepless transmission determined by said driving output setting means; and
   a second driving unit for generating a difference of rotary speed between said pair of drive wheels so as to steer a vehicle, said second driving unit comprising,
      a pair of first and second steering output shafts differentially connected with each other,
      a second hydrostatic stepless transmission including a hydraulic pump and a hydraulic motor fluidly connected with each other for transmitting power from said prime mover to said first and second steering output shafts, and
      steering output setting means, wherein said first and second steering output shafts are driven according to a direction and speed of output rotation of said hydraulic motor of said second hydrostatic stepless transmission determined by said steering output setting means,
   wherein said driving output setting means comprises a movable swash plate of said hydraulic pump or said hydraulic motor of said first hydrostatic stepless transmission, and wherein said steering output setting means comprises a movable swash plate of said hydraulic pump or said hydraulic motor of said second hydrostatic stepless transmission.

57. The transaxle apparatus as set forth in claim 56, wherein said movable swash plate of said driving output setting means interlocks with a speed control operating member provided on a driver's portion of said vehicle, and wherein said movable swash plate of said steering output setting means interlocks with a steering operating member provided on said driver's portion of said vehicle.

58. The transaxle apparatus as set forth in claim 57, wherein linkages interposed between said movable swash plate of said driving output setting means and said speed control operating member and interposed between said movable swash plate of said steering output setting means and said steering operating member are disposed below said driver's portion of said vehicle.

59. The transaxle apparatus as set forth in claim 57, wherein said driving output setting means comprises a lever rotated along the traveling direction of said vehicle according to the operation of said speed control operating member, and wherein said steering output setting means comprises a lever rotated along the traveling direction of said vehicle according to the operation of said steering operating member.

60. The transaxle apparatus as set forth in claim 57, wherein said speed control operating member is a foot pedal and said steering operating member is a steering wheel.

61. The transaxle apparatus as set forth in claim 60, wherein said foot pedal comprises a forward driving pedal and a backward driving pedal, and wherein a direction of output rotation of said hydraulic motor of said first hydrostatic stepless transmission is determined according to which is pressed, said forward driving pedal or said backward driving pedal.

62. The transaxle apparatus as set forth in claim 60, wherein said steering wheel is rotatable from a straight traveling position in two opposite directions for left-turning and right-turning of said vehicle, and wherein a direction of output rotation of said hydraulic motor of said second hydrostatic stepless transmission is determined according to which direction said steering wheel is rotated from said straight traveling position.

63. A transaxle apparatus for speed changing and steering of a vehicle, comprising:
   a vehicle chassis;
   a prime mover mounted on said vehicle chassis;
   a pair of drive wheels;
   a first driving unit for driving said pair of drive wheels forwardly and backwardly at various speeds, said first driving unit comprising,
      a pair of first and second axles differentially connected with each other, said pair of drive wheels being mounted onto said respective first and second axles,
      a first hydrostatic stepless transmission including a hydraulic pump and a hydraulic motor fluidly connected with each other for transmitting power from said prime mover to said first and second axles, and
      driving output setting means, wherein said first and second axles are driven according to a direction and speed of output rotation of said hydraulic motor of said first hydrostatic stepless transmission determined by said driving output setting means; and
   a second driving unit for generating a difference of rotary speed between said pair of drive wheels so as to steer a vehicle, said second driving unit comprising,
      a pair of first and second steering output shafts differentially connected with each other,
      a second hydrostatic stepless transmission including a hydraulic pump and a hydraulic motor fluidly connected with each other for transmitting power from said prime mover to said first and second steering output shafts, and
      steering output setting means, wherein said first and second steering output shafts are driven according to a direction and speed of output rotation of said hydraulic motor of said second hydrostatic stepless transmission determined by said steering output setting means,
   wherein an output shaft of said prime mover is disposed between an input shaft of said first transmission and an input shaft of said second transmission.

64. The transaxle apparatus as set forth in claim 63, wherein three pulleys respectively provided on said output shaft of said prime mover and input shafts of said first and second transmissions are bound through a single belt.

65. The transaxle apparatus as set forth in claim 64, wherein said prime mover is an engine provided with a crankshaft having a vertical axis.

66. The transaxle apparatus as set forth in claim 45, wherein at least one caster is supported by said vehicle chassis.

67. The transaxle apparatus as set forth in claim 45, wherein said vehicle is provided with a mower unit.

68. A vehicle comprising:
- a vehicle chassis;
- a prime mover mounted on a rear portion of said vehicle chassis;
- a pair of first and second drive wheels;
- a first axle coupled with said first drive wheel;
- a second axle coupled with said second drive wheel;
- a transaxle apparatus supported by said vehicle chassis and supporting said first and second axles for speed changing and steering of said vehicle, said transaxle apparatus including
  - a driving transmission for driving said vehicle and a steering transmission, said driving transmission drivingly connecting said prime mover to said first and second axles for rotating said first and second drive wheels at various speeds forwardly and backwardly,
  - a manually operable first output regulating member constituting said driving transmission for controlling the speed and direction of output rotation of said driving transmission,
  - a steering transmission for turning said vehicle, said steering transmission drivingly connecting said prime mover to said first and second axles for accelerating one of said first and second drive wheels and decelerating the other of said first and second drive wheels, and
  - a manually operable second output regulating member constituting said steering transmission for controlling the speed and direction of output rotation of said steering transmission;
- a steering wheel for manual operation of said second regulating member, said steering wheel provided with a straight driving position for stopping the output rotation of said second transmission and being rotatable from said straight driving position; and
- a linkage interposed between said steering wheel and said second regulating member, said linkage including
  - a stem of said steering wheel,
  - a first lever interlocking with said stem,
  - a control shaft constituting said second output regulating member, said control shaft provided with a neutral position corresponding to said straight driving position and being rotatable in opposite directions from said neutral position,
  - a second lever interlocking with said control shaft, and
  - a link connecting said first lever to said second lever.

69. The vehicle according to claim 68, wherein said first lever is a fan-shaped gear.

70. The vehicle according to claim 69, further comprising: a pinion provided in said stem, said pinion engaging with said fan-shaped gear.

71. The vehicle according to claim 68, wherein said second lever is a control arm fixed on said control shaft.

72. A vehicle comprising:
- a vehicle chassis;
- a prime mover mounted on a rear portion of said vehicle chassis;
- a pair of first and second drive wheels;
- a first axle coupled with said first drive wheel;
- a second axle coupled with said second drive wheel;
- a transaxle apparatus supported by said vehicle chassis and supporting said first and second axles for speed changing and steering of said vehicle, said transaxle apparatus including
  - a driving transmission for driving said vehicle and a steering transmission, said driving transmission drivingly connecting said prime mover to said first and second axles for rotating said first and second drive wheels at various speeds forwardly and backwardly,
  - a manually operable first output regulating member constituting said driving transmission for controlling the speed and direction of output rotation of said driving transmission,
  - a steering transmission for turning said vehicle, said steering transmission drivingly connecting said prime mover to said first and second axles for accelerating one of said first and second drive wheels and decelerating the other of said first and second drive wheels, and
  - a manually operable second output regulating member constituting said steering transmission for controlling the speed and direction of output rotation of said steering transmission;
- a steering operation means for manual operation of said second regulating member; and
- a mechanical linkage interposed between said steering operation means and said second regulating member.

\* \* \* \* \*